(12) United States Patent
Chen et al.

(10) Patent No.: US 7,301,345 B2
(45) Date of Patent: Nov. 27, 2007

(54) WHILE-DRILLING METHODOLOGY FOR ESTIMATING FORMATION PRESSURE BASED UPON STREAMING POTENTIAL MEASUREMENTS

(75) Inventors: Min-Yi Chen, Pearland, TX (US); Brian Clark, Sugar Land, TX (US); Anthony Collins, Houston, TX (US); Jeffrey Tarvin, Brookfield, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 11/223,883

(22) Filed: Sep. 9, 2005

(65) Prior Publication Data
US 2006/0125474 A1    Jun. 15, 2006

Related U.S. Application Data

(63) Continuation-in-part of application No. 10/871,856, filed on Jun. 18, 2004, which is a continuation-in-part of application No. 10/871,854, filed on Jun. 18, 2004, now Pat. No. 6,978,672, which is a continuation-in-part of application No. 10/871,446, filed on Jun. 18, 2004, which is a continuation-in-part of application No. 10/872,112, filed on Jun. 18, 2004.

(51) Int. Cl.
*G01V 3/18* (2006.01)
*G01V 1/40* (2006.01)

(52) U.S. Cl. .................. 324/347; 324/351; 702/11
(58) Field of Classification Search ................. 324/347, 324/351; 702/11
See application file for complete search history.

(56) References Cited

U.S. PATENT DOCUMENTS

| | | | |
|---|---|---|---|
| 1,927,664 A | 9/1933 | Karcher | 175/182 |
| 2,214,786 A | 9/1940 | Bishop | 175/182 |
| 2,249,769 A | 7/1941 | Leonardon | 175/182 |

(Continued)

FOREIGN PATENT DOCUMENTS

EP    43768 A1    1/1982

(Continued)

OTHER PUBLICATIONS

Bryant et al. "Real-Time Monitoring and Control of Water Influx to a Horizontal Well Using Advanced Completion Equipped with Permanent Sensors." SPE 77522 SPE Annual Technical Conference and Exhibition, San Antonio, Texas (Sep. 29-Oct. 2, 2002).

(Continued)

*Primary Examiner*—Bot LeDynh
(74) *Attorney, Agent, or Firm*—David P. Gordon; Vincent Loccisano; Jody Lynn DeStefanis

(57) ABSTRACT

Logging-while-drilling apparatus and methodologies for measuring streaming potential in an earth formation are provided. The apparatus and methodologies can be utilized to find information relevant to the drilling operations. In particular, since the streaming potential measurement relates directly to fluid flow, the streaming potential measurements can be used to track flow of fluids in the formation. In turn, this information may be used to find information relevant to the drilling operations, such as under-balanced drilling conditions, abnormal formation pressures, open fractures, the permeability of the formation, and formation pressure.

10 Claims, 36 Drawing Sheets

U.S. PATENT DOCUMENTS

| | | | |
|---|---|---|---|
| 2,281,960 A | 5/1942 | Vacquier | 73/152.16 |
| 2,400,678 A | 5/1946 | Archie | 324/351 |
| 2,433,746 A | 12/1947 | Doll | 175/182 |
| 2,569,625 A | 10/1951 | Wyllie | 324/351 |
| 2,588,717 A | 3/1952 | Goodwin | 73/152.17 |
| 2,658,725 A | 11/1953 | Arps | 255/1 |
| 2,669,690 A | 2/1954 | Doll | 324/367 |
| 2,725,282 A | 11/1955 | Buckley et al. | 422/82.12 |
| 2,728,047 A | 12/1955 | Doll | 324/1 |
| 2,814,017 A | 11/1957 | Doll | 324/1 |
| 2,917,704 A | 12/1959 | Arps | 324/1 |
| 3,115,942 A | 12/1963 | Arps | 175/50 |
| 3,268,801 A | 8/1966 | Clements et al. | 324/10 |
| 3,399,723 A | 9/1968 | Stuart | 166/4 |
| 3,453,530 A | 7/1969 | Attali | 324/373 |
| 3,454,870 A | 7/1969 | Norman et al. | 324/347 |
| 3,596,511 A | 8/1971 | Hart | 73/864.44 |
| 3,599,085 A | 8/1971 | Semmelink | 324/1 |
| 3,638,484 A | 2/1972 | Tixier | 73/152.02 |
| 3,784,900 A | 1/1974 | Schuster | 324/367 |
| 3,896,413 A | 7/1975 | Dowling et al. | 367/25 |
| 3,914,686 A | 10/1975 | Brooks | 324/351 |
| 4,019,125 A | 4/1977 | Daniel | 324/374 |
| 4,048,495 A | 9/1977 | Ellis | 250/264 |
| 4,233,839 A | 11/1980 | Coates | 73/152.06 |
| 4,245,313 A | 1/1981 | Coates | 702/13 |
| 4,369,497 A | 1/1983 | Poupon et al. | 702/8 |
| 4,420,975 A | 12/1983 | Nagel et al. | 73/152.41 |
| 4,427,944 A | 1/1984 | Chandler | 324/353 |
| 4,495,604 A | 1/1985 | Clavier et al. | 367/25 |
| 4,575,681 A | 3/1986 | Grosso et al. | 324/347 |
| 4,600,059 A | 7/1986 | Eggleston et al. | 166/385 |
| 4,628,202 A | 12/1986 | Minette | 250/269.3 |
| 4,716,973 A | 1/1988 | Cobern | 175/50 |
| 4,791,618 A | 12/1988 | Pruchnik | 367/25 |
| 4,831,600 A | 5/1989 | Hornby et al. | 367/31 |
| 4,882,542 A | 11/1989 | Vail, III | 324/368 |
| 4,884,071 A * | 11/1989 | Howard | 340/854.8 |
| 5,008,625 A | 4/1991 | Chen | 324/351 |
| 5,043,668 A | 8/1991 | Vail, III | 324/368 |
| 5,103,178 A | 4/1992 | Desbrandes | 324/351 |
| 5,200,705 A | 4/1993 | Clark et al. | 324/338 |
| 5,214,384 A | 5/1993 | Sprunt et al. | 324/351 |
| 5,242,020 A | 9/1993 | Cobern | 166/254.2 |
| 5,302,781 A | 4/1994 | Hanson, III | 181/102 |
| 5,402,069 A | 3/1995 | Tabanou et al. | 324/351 |
| 5,417,104 A | 5/1995 | Wong | 73/38 |
| 5,497,321 A | 3/1996 | Ramakrishnan et al. | 702/12 |
| 5,502,686 A | 3/1996 | Dory et al. | 367/34 |
| 5,503,001 A | 4/1996 | Wong | 73/38 |
| 6,061,634 A | 5/2000 | Belani et al. | 702/12 |
| 6,105,690 A | 8/2000 | Biglin, Jr. et al. | 175/48 |
| 6,225,806 B1 | 5/2001 | Millar et al. | 324/353 |
| 6,376,838 B1 | 4/2002 | Odom | 250/269.6 |
| 6,452,395 B1 | 9/2002 | Clarke et al. | 324/323 |
| 6,454,870 B1 | 9/2002 | Brooks | 134/3 |
| 6,714,138 B1 | 3/2004 | Turner et al. | 340/854.3 |
| 6,842,700 B2 * | 1/2005 | Poe | 702/13 |
| 6,978,672 B1 | 12/2005 | Chen et al. | 73/152.17 |
| 6,997,257 B2 | 2/2006 | Snoga | 166/254.1 |
| 2004/0124841 A1 | 7/2004 | Omeragic | 324/337 |
| 2004/0162676 A1 * | 8/2004 | Thomann et al. | 702/9 |
| 2005/0279161 A1 | 12/2005 | Chen et al. | 73/152.05 |
| 2005/0279497 A1 | 12/2005 | Chen et al. | 166/252.5 |
| 2005/0280419 A1 | 12/2005 | Chen et al. | 324/324 |
| 2006/0089804 A1 | 4/2006 | Chen et al. | 702/1 |

FOREIGN PATENT DOCUMENTS

| | | |
|---|---|---|
| EP | 43768 B1 | 3/1985 |
| WO | WO 99/05545 A | 7/1998 |
| WO | WO02/053871 | 7/2002 |

OTHER PUBLICATIONS

Fordham, E.J., and H.K.J. Ladva, "Cross-flow Filtration of Bentonite Suspensions", PhysicoChemical Hydrodynamics, 11(4), 411-439 (1989).

Hovhannissian et al. "Transient electric phenomena observed during fluid circulation in unsaturated porous media." Geophysical Research Letters, vol. 29, No. 1, pp. 5-1 to 5-4.

Wurmstich et al. "Modeling of streaming potential reponses caused by oil well pumping." Geophysics, vol. 59, No. 1 (Jan. 1994), pp. 46-56.

International Search Report for PCT/US2006/034526 mailed Mar. 14, 2007.

International Search Report for PCT/US2006/034160 mailed Jan. 19, 2007.

International Search Report and Written Opinion for PCT/US2006/034159 mailed May 29, 2007.

International Search Report and Written Opinion for PCT/US2006/034291 mailed Jun. 19, 2007.

* cited by examiner

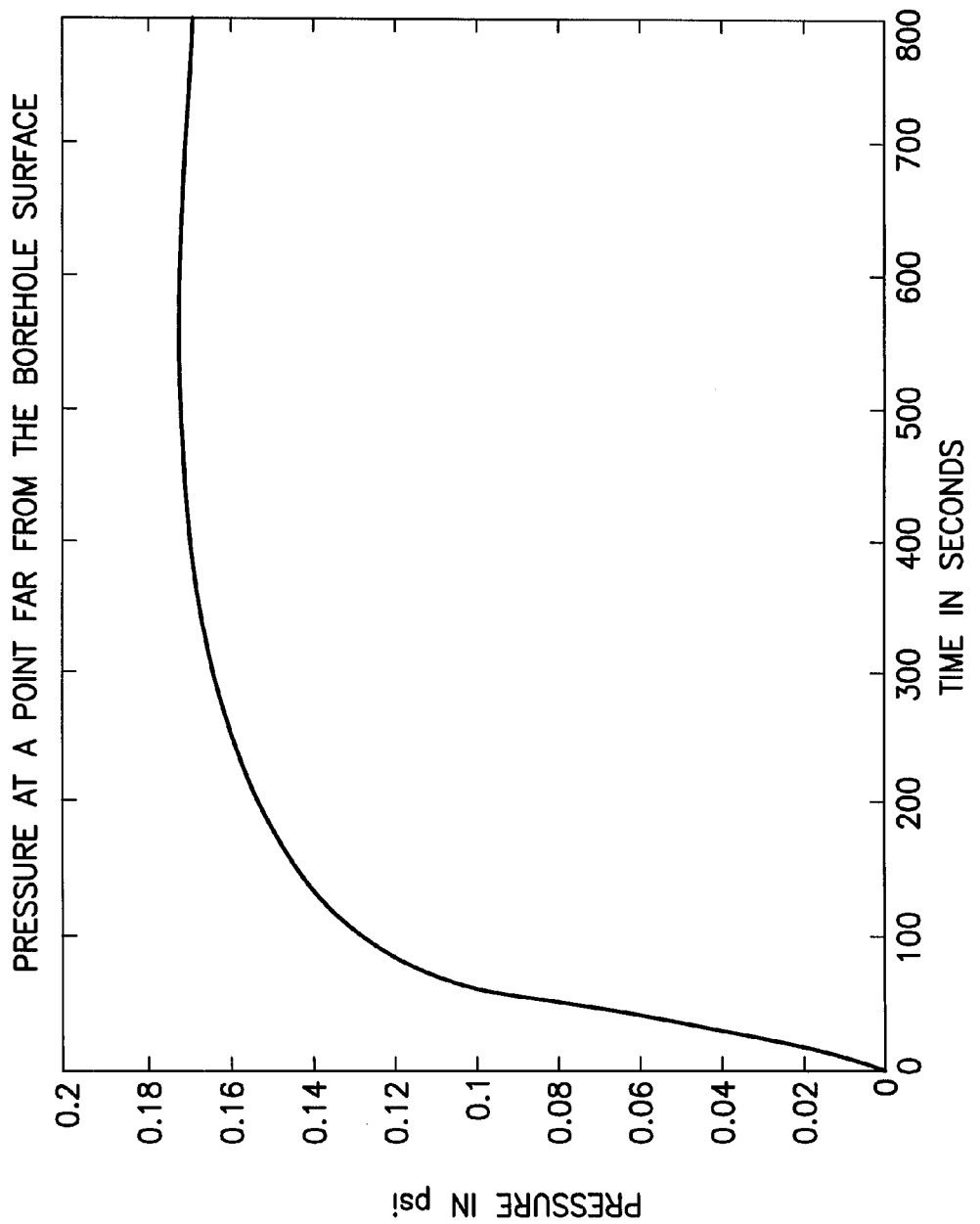

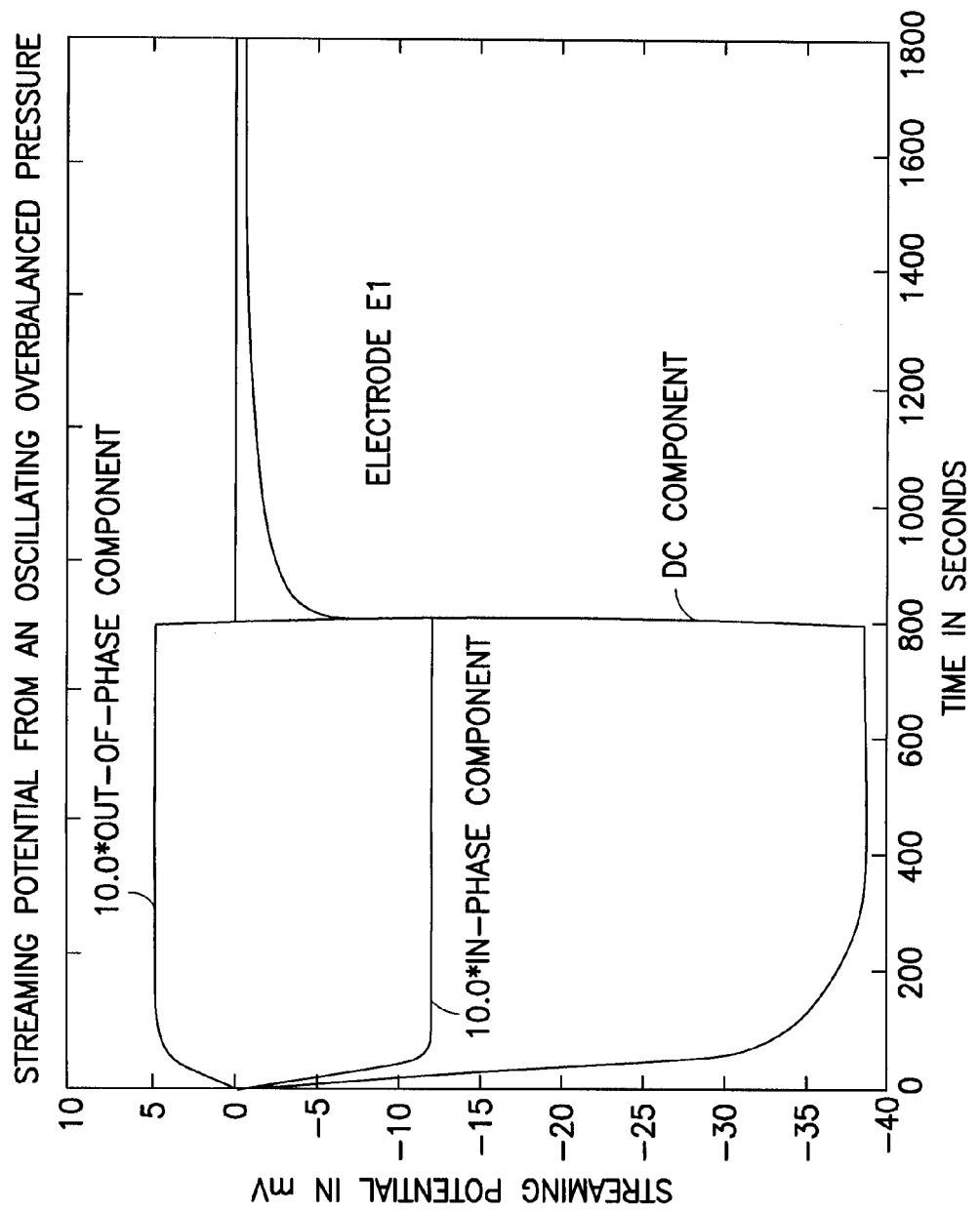

WHILE-DRILLING METHODOLOGY FOR ESTIMATING FORMATION PRESSURE BASED UPON STREAMING POTENTIAL MEASUREMENTS

CROSS-REFERENCE TO RELATED APPLICATIONS

This application is a continuation-in-part of the following U.S. Patent Applications of which this application claims the benefits of priority from:

i) application Ser. No. 10/871,856, entitled "WHILE-DRILLING APPARATUS FOR MEASURING STREAMING POTENTIALS AND DETERMINING EARTH FORMATION CHARACTERISTICS," filed on Jun. 18, 2004;

ii) application Ser. No. 10/871,854, entitled "WIRELINE APPARATUS FOR MEASURING STREAMING POTENTIALS AND DETERMINING EARTH FORMATION CHARACTERISTICS," filed on Jun. 18, 2004 now U.S. Pat. No. 6,978,672;

iii) application Ser. No. 10/871,446, entitled "COMPLETION APPARATUS FOR MEASURING STREAMING POTENTIALS AND DETERMINING EARTH FORMATION CHARACTERISTICS," filed on Jun. 18, 2004; and iv) application Ser. No. 10/872,112, entitled "METHODS FOR LOCATING FORMATION FRACTURES AND MONITORING WELL COMPLETION USING STREAMING POTENTIAL TRANSIENTS INFORMATION," filed on Jun. 18, 2004;

all of which are commonly assigned to assignee of the present invention and hereby incorporated by reference in their entirety.

This patent application is also related to the following commonly-assigned U.S. Patent Applications which are hereby incorporated by reference in their entirety:

i) Ser. No. 11/223,676, entitled "WHILE-DRILLING APPARATUS FOR MEASURING STREAMING POTENTIALS AND DETERMINING EARTH FORMATION CHARACTERISTICS AND OTHER USEFUL INFORMATION";

ii) Ser. No. 11/223,644, entitled "WHILE-DRILLING APPARATUS FOR MEASURING STREAMING POTENTIALS AND DETERMINING EARTH FORMATION CHARACTERISTICS AND OTHER USEFUL INFORMATION";

iii) Ser. No. 11/223,689, entitled "WHILE-DRILLING METHODOLOGY FOR DETERMINING EARTH FORMATION CHARACTERISTICS AND OTHER USEFUL INFORMATION BASED UPON STREAMING POTENTIAL MEASUREMENTS";

each such U.S. Patent Application being simultaneously filed herewith.

BACKGROUND OF THE INVENTION

1. Field of the Invention

This invention relates broadly to the hydrocarbon industry. More particularly, this invention relates to apparatus and methods for measuring streaming potentials resulting from pressure transients in an earth formation traversed by a borehole. This invention also relates to manners of making determinations regarding earth formation characteristics as a result of streaming potential measurements. One such characteristic is the permeability of the formation at different depths thereof, although the invention is not limited thereto.

2. State of the Art

Streaming potential, also commonly referred to as electrokinetic potential, is an electric potential generated by an electrolyte (e.g., water) flowing through a porous medium. The history with respect to the possibility of making streaming potential measurements in a borehole is a long one. In U.S. Pat. No. 2,433,746, Doll suggested that vigorous vibration of a downhole apparatus in a borehole could generate pressure oscillations and fluid movement relative to the formation which in turn could give rise to measurable streaming potentials due to an electrokinetic potential phenomenon. In U.S. Pat. No. 2,814,017, Doll suggested methods for investigating the permeabilities of earth formations by observing the differences in phase between periodic pressure waves passed through the formations and potentials generated by the oscillatory motion of the formation fluid caused by these pressure waves. Conversely, a periodically varying electric current was suggested to be used to generate oscillatory motion of the formation fluid, which in turn generated periodic pressure waves in the formation. Measurements were to be made of the phase displacement between the generating and the generated quantities and a direct indication of the relative permeability of the formation thereby obtained.

In U.S. Pat. No. 3,599,085, to A. Semmelink, entitled, "Apparatus For Well Logging By Measuring And Comparing Potentials Caused By Sonic Excitation", the application of low-frequency sonic energy to a formation surface was proposed so as to create large electrokinetic pulses in the immediate area of the sonic generator. In accordance with the disclosure of that patent, the electrokinetic pulses result from the squeezing (i.e. the competition of viscosity and inertia) of the formation, and the streaming potential pulses generate periodic movements of the formation fluid relative to the formation rock. The fluid movement produces detectable electrokinetic potentials of the same frequency as the applied sonic energy and having magnitudes at any given location directly proportional to the velocity of the fluid motion at that location and inversely proportional to the square of the distance from the locus of the streaming potential pulse. Since the fluid velocity was found to fall off from its initial value with increasing length of travel through the formation at a rate dependent in part upon the permeability of the formation rock, it was suggested that the magnitude of the electrokinetic potential at any given distance from the pulse provided a relative indication of formation permeability. By providing a ratio of the electrokinetic potential magnitudes (sinusoidal amplitudes) at spaced locations from the sonic generator, from which electrokinetic skin depth may be derived, actual permeability can in turn be determined.

In U.S. Pat. No. 4,427,944, Chandler suggested a stationary-type borehole tool and method for determining formation permeability. The borehole tool includes a pad device which is forced into engagement with the surface of the formation at a desired location, and which includes means for injecting fluid into the formation and electrodes for measuring electrokinetic streaming potential transients and response times resulting from the injection of the fluid. The fluid injection is effectively a pressure pulse excitation of the formation which causes a transient flow to occur in the formation. Chandler suggests a measurement of the characteristic response time of the transient streaming potentials generated in the formation by such flow in order to derive accurate information relating to formation permeability.

In U.S. Pat. No. 5,503,001 (1996), Wong proposed a process and apparatus for measuring at finite frequency the streaming potential and electro-osmotic induced voltage due to applied finite frequency pressure oscillations and alternating current. The suggested apparatus includes an electromechanical transducer which generates differential pressure oscillations between two points at a finite frequency and a plurality of electrodes which detect the pressure differential and streaming potential signal between the same two points near the source of the pressure application and at the same frequency using a lock-in amplifier or a digital frequency response analyzer. According to Wong, because the apparatus of the invention measures the differential pressure in the porous media between two points at finite frequencies close to the source of applied pressure (or current), it greatly reduces the effect of background caused by the hydrostatic pressure due to the depth of the formation being measured.

Despite the long history and multiple teachings of the prior art, it is believed that in fact, prior to field measurements made in support of instant invention, no downhole measurements of streaming potential transients in actual oil fields have ever been made. The reasons for the lack of actual implementation of the proposed prior art embodiments are several. According to Wong, neither the streaming potential nor the electro-osmotic measurement alone is a reliable indication of formation permeability, especially in formations of low permeability. Wong states that attempts to measure the streaming potential signal with electrodes at distances greater than one wavelength from each other are flawed since pressure oscillation propagates as a sound wave and the pressure difference would depend on both the magnitude and the phase of the wave, and the streaming potential signal would be very much lower since considerable energy is lost to viscous dissipation over such a distance. In addition, Wong states that application of a dc flow to a formation and measurement of the response voltage in the time domain will not work in low permeability formations since the longer response time and very low streaming potential signal is dominated by drifts of the electrodes' interfacial voltage over time. Thus, despite the theoretical possibilities posed by the prior art, the conventional wisdom of those skilled in the art (of which Wong's comments are indicative) is that useful streaming potential measurements are not available due to low signal levels, high noise levels, poor spatial resolution, and poor long-term stability.

Indeed, it is difficult to obtain pressure transient data with high spatial resolution as the borehole is essentially an isobaric region. The pressure sensor placed inside the borehole cannot give detailed information on the pressure transients inside the formation if the formation is heterogeneous. To do so, it is necessary to segment the borehole into hydraulically isolated zones, a difficult and expensive task to perform. Further, it will be appreciated that some of the proposed tools of the prior art, even if they were to function as proposed, are extremely limited in application. For example, the Chandler device will work only in drilled boreholes prior to casing and requires that the tool be stationed for a period of time at each location where measurements are to be made. Thus, the Chandler device cannot be used as an MWD/LWD (measurement or logging while drilling) device, is not applicable to finished wells for making measurements during production, and cannot even be used on a moving string of logging devices.

SUMMARY OF THE INVENTION

It is therefore an object of the invention to provide methods and apparatus for measuring streaming potential in an earth formation.

It is another object of the invention to provide methods and apparatus for measuring streaming potentials in a formation while drilling a borehole.

It is an additional object of the invention to provide methods of determining formation characteristics using streaming potentials measurements.

Another object of the invention is to provide methods of identifying dangerous drilling conditions, such as under-balanced drilling conditions and/or fluid loss from fractures, using streaming potential measurements.

A further object of the invention is to provide methods of determining formation permeability and/or formation pressure using streaming potential measurements.

In accord with these objects, which will be discussed in detail below, a logging-while-drilling apparatus and methodologies for measuring streaming potential in an earth formation are provided. For purposes herein, logging-while-drilling (LWD) applications and measurement-while-drilling (MWD) applications will be considered interchangeable. The apparatus and methodologies can be utilized to find information relevant to the drilling operations. In particular, since the streaming potential measurement relates directly to fluid flow, the streaming potential measurements can be used to track flow of fluids in the formation. In turn, this information may be used to find information relevant to the drilling operations, such as under-balanced drilling conditions, abnormal formation pressures, open fractures, the permeability of the formation, and formation pressure.

Additional objects and advantages of the invention will become apparent to those skilled in the art upon reference to the detailed description taken in conjunction with the provided figures.

BRIEF DESCRIPTION OF THE DRAWINGS

FIG. 7B is a plot of pressure at an interior point of the formation away from the borehole surface.

FIG. 8 is a plot of the DC, in-phase and out-of-phase components of the streaming potential signal measured by the electrode E1 in conjunction with an oscillating overbalanced pressure, which is generated by the model of FIG. 3.

DETAILED DESCRIPTION

Figure 1:
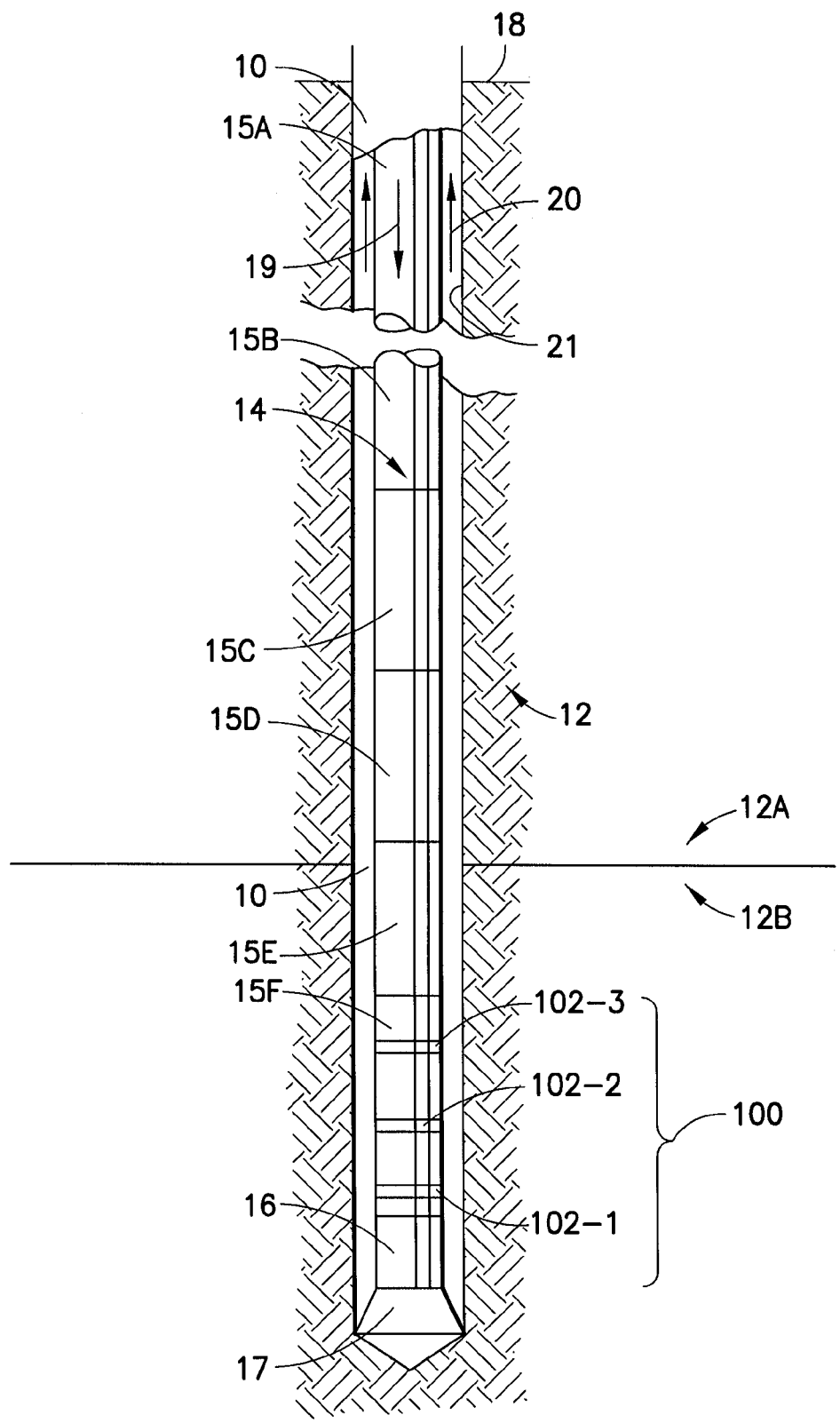
FIG. 1 is a schematic diagram of a drill string that is suspended in a borehole together with a logging-while-drilling apparatus that derives streaming potential measurements in accordance with the present invention.

Prior to turning to the Figures, some theoretical considerations governing the physics of the invention are useful. In reservoir rocks there exists a thin charged double layer at the interface between the porous rock matrix and water in the porous rock matrix. In typical conditions, the matrix surface is negatively charged, and the water is positively charged. When water moves under a pressure gradient $\nabla p$, an electrical current $i_e$ is created with the water current. The electrical current is proportional to the water current, which is proportional to the pressure gradient:

$$i_e = L\nabla p, \quad (1)$$

where L is a coupling constant which is a property of the fluid-saturated rock.

Pressure transients are created in the formation by many different operations that occur over the lifetime of a well such as drilling, mud invasion, cementing, water and acid injection, fracturing, and oil and gas production. Pressure transient testing is an established technique to determine reservoir properties such as permeability, reservoir size, and communication between different zones and between different wells. As is set forth below, streaming potential transients associated with the pressure transients can also be used to determine these properties.

The modeling of the reservoir pressure p can be carried out with multiphase flow models. For the modeling of the streaming potential, it is useful to start with the diffusion equation of a single-phase flow:

$$\nabla \cdot \frac{k}{\mu} \nabla p = \phi c \frac{\partial}{\partial t} p, \quad (2)$$

where k is the permeability, $\mu$ is the viscosity, $\phi$ is the porosity, and c is the fluid compressibility.

From the modeled pressure field p, the streaming potential V can be calculated by solving the Poisson Equation:

$$-\nabla \cdot \sigma \nabla V = \nabla \cdot L \nabla p, \quad (3)$$

where $\sigma$ is the electrical conductivity.

From Eq. (2) it follows that the time $\Delta t$ for a pressure transient and the associated streaming potential transient created at the borehole surface to diffuse through a distance $\Delta x$ into the formation is given by:

$$\Delta t \sim \frac{\phi c \mu}{k} (\Delta x)^2. \quad (4)$$

The early time pressure and streaming potential transients are sensitive mainly to reservoir properties near the borehole, and the late time transients are sensitive to reservoir properties both near the borehole and farther away from the borehole. By interpreting the measured transients in a time ordered fashion, reservoir properties at different distances to the borehole can be determined. The interpretation of pressure transients in this time ordered fashion is an established art. For example, early time pressure transients are used to determine damage to permeabilities of "skin", and late time pressure transients are used to determine reservoir boundaries. As is set forth below, streaming potential transients associated with the pressure transients can be used to determine these properties.

The applications are much more limited if the steady state values of the streaming potentials are the only measurements available. At a steady state, equation (2) becomes $$\nabla \cdot \frac{k}{\mu} \nabla p = 0. \quad (5)$$

The pressure drop $\Delta p$ across a depth interval $\Delta x$ is then proportional to.

$$\Delta p \propto \frac{\mu}{k} \Delta x. \quad (6)$$

The drop in the streaming potential $\Delta V$ is related to $\Delta p$ by $$\Delta V = -\frac{L}{\sigma} \Delta p, \quad (7)$$

which is proportional to $$\Delta V \propto \frac{L\mu}{\sigma k} \Delta x. \quad (8)$$

The steady state streaming potential can only give information on the average value of a reservoir property and as a result is dominated by intervals with high values of $(L\mu)/(\sigma k)$. It is believed that in the presence of a mudcake, the steady state streaming potential is dominated by the mudcake and is insensitive to reservoir properties. The permeability of the mudcake is extremely low, and the steady state pressure drop mainly exists across the mudcake.

While in principle it is possible to determine reservoir properties at all distances to the borehole (i.e., radially from the borehole) by interpreting the transients in a time ordered fashion, the critical question in practice is whether the measurements can be made with sufficient quality: accuracy, spatial resolution, and stability over long time. It is difficult to get pressure transient data with high spatial resolution as the borehole is essentially an isobaric region. A pressure sensor placed inside the borehole cannot give detailed information on the pressure transients inside the formation if the formation is heterogeneous. To do so, it would be necessary to segment the borehole into hydraulically isolated zones, a difficult and expensive task to perform. On the other hand, the borehole is not an equipotential surface for electric current flow. Thus, streaming potential transients may be measured by an array of electrodes placed inside the borehole and electrically isolated (i.e., insulated) one from the other and can provide equivalent information to that of hydraulically isolated zone pressure transient testing because the streaming potential is determined by the pressure gradient. In fact, by utilizing an array of isolated streaming potential electrodes, the streaming potential can be measured with a higher spatial resolution than hydraulically isolated zone pressure transient testing.

Formation properties vary from place to place (inhomogeneity) and may also vary with direction at a given place (anisotropy). Consequently, the streaming potential at a particular depth may vary around the circumference of the borehole. For example, a fracture that crosses the borehole at an oblique angle can produce significant changes in streaming potential with azimuth. Another example is permeability anisotropy, which modifies the flow distribution resulting from a pressure transient. Since the flow distribution affects the streaming potential, permeability anisotropy can also produce azimuthal variations in streaming potential. Thus, azimuthal measurements of streaming potential may be interpreted to determine inhomogeneity and anisotropy of formation properties.

Given the theoretical understandings above, according to one aspect of the invention, an apparatus and method for measuring streaming potentials while drilling a borehole is provided. In particular, during drilling, a pressure difference between the formation and the borehole creates mud invasion and pressure transients, and thus, streaming potential transients. In wells drilled with an oil-based mud, a streaming potential will exist if the mud contains a water fraction.

Turning now to FIG. 1, a schematic illustration of a borehole 10 drilled into a formation 12 by a rotary drilling apparatus that employs a while-drilling streaming potential measurement tool in accordance with the present invention. The drilling apparatus includes a drill string 14 composed of a number of interconnected tubular drill collar sections (including the six shown as 15A, 15B, 15C, 15D, 15E, 15F) supporting at their lower end a drill collar 16 terminated by a drill bit 17. At the surface, the drill string 14 is supported and rotated by standard apparatus (not shown), thereby rotating the drill bit 17 to advance the depth of the borehole 10.

A recirculating flow of drilling fluid or mud is utilized to lubricate the drill bit 17 and to convey drill tailings and debris to the surface 18. Accordingly, the drilling fluid is pumped down the borehole 10 and flows through the interior of the drill string 14 (as indicated by arrow 19), and then exits via ports (not shown) in the drill bit 17. The drilling fluid exiting the drill bit 17 circulates upward (as indicated by arrows 20) in the region between the outside of the drill string 14 and the periphery 21 of the borehole, which is commonly referred to as the annulus.

The bottom portion of the drill string 14, including the drill bit 17, the drill collar 16 and at least one tubular drill collar section connected the drill collar 16 (e.g. drill collar section 15F), is referred to as a bottom hole assembly 100. In accordance with the present invention, the bottom hole assembly 100 includes capabilities of measuring streaming potential while-drilling as described below in more detail. The while-drilling measurements are observed in the borehole 10 with the bottom hole assembly 100 located in the borehole during drilling, pausing, tripping or other operations.

Figure 2:
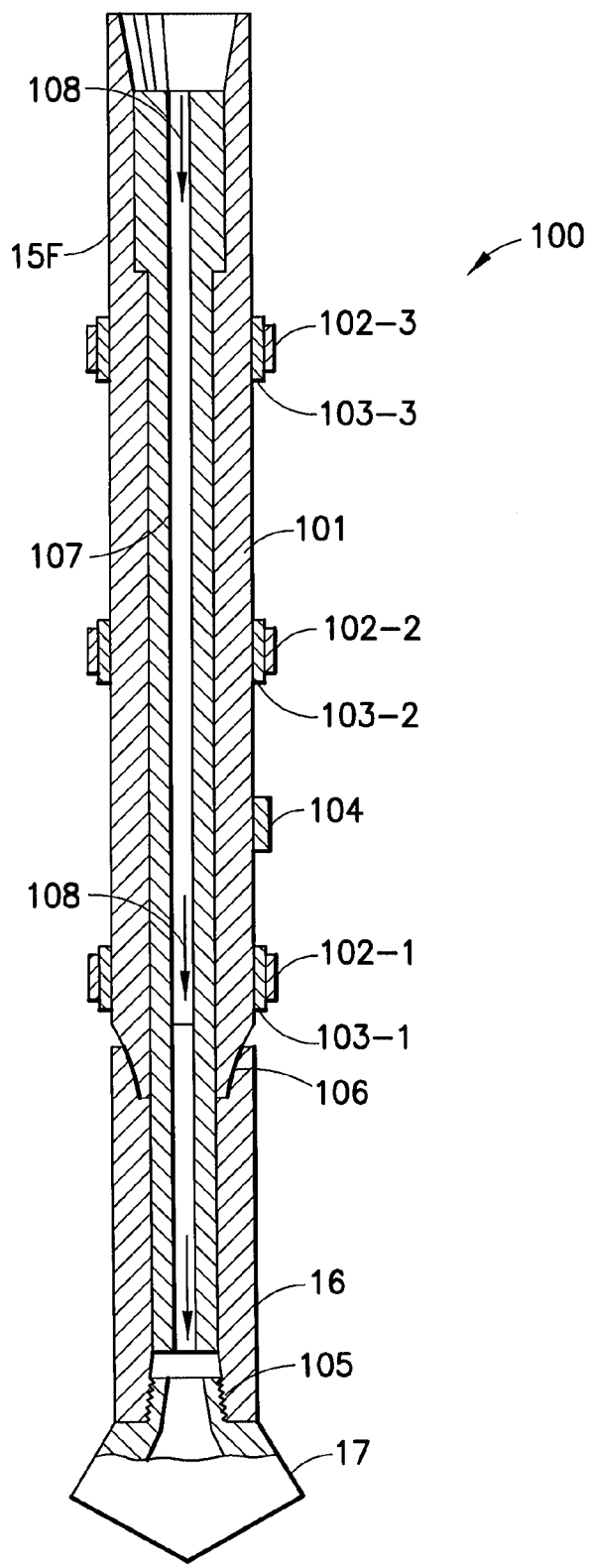
FIG. 2 is a cross-sectional view of the bottom-hole assembly of the drill string, which embodies an exemplary embodiment of a logging-while-drilling apparatus in accordance with the present invention.

As shown in the cross-section of FIG. 2, the bottom hole assembly 100 includes a series of interconnected elements including the tubular drill collar section 15F, the drill collar 16 and the drill bit 17. The drill collar section 15F includes a metal body 101 and three external ring electrodes 102-1, 102-2, 102-3 that are spaced apart longitudinally and mounted on a suitable insulating medium (e.g., insulating pads 103-1, 103-2, 103-3) that electrically insulates the electrodes from the metal body 101. The drill collar section 15F also includes a pressure sensor 104 mounted thereon for measuring the downhole pressure.

The drill bit 17 is interconnected to the bottom of the drill collar 16 by a threaded coupling 105. The top of the drill collar 16 is interconnected to the bottom of the drill collar section 15F by an insulation joint 106 that electrically insulates the metal body of the drill collar section 15F from the drill collar 16 and the drill bit 17. The insulation joint 106 allows the metal body of the drill collar 16 and drill bit 17, collectively, to be used as a measuring electrode for streaming potential measurements and also allows the metal body 101 of the drill collar section to be used as a voltage reference electrode for streaming potential measurements as described below in more detail. In the preferred embodiment, one of the electrodes (102-1) is located adjacent to (or on) the insulating joint 106. In this configuration, the electric streaming current created by the spurt loss at the drill bit 17 is forced to flow further out in the formation 12 and into the drill string above the isolation joint 106. With the electrode 102-1 placed adjacent to (or on) the isolation joint 106, it will have a strong signal even if it is a good distance behind the drill bit 17.

An annular chassis 107 fits within the drill collar section 15F and the drill collar 16. The annular chassis does not provide an electrical short circuit between the drill collar section 15F and the drill collar 16. Preferably, the annular chassis ends at the isolation joint and an insulated wire connects electronics inside the annular chassis to the drill collar 16. Alternatively, if a portion of the annular chassis extends below the isolation joint, it is made of a non-conductive material (for example, made of fiberglass epoxy). The annular chassis 107 houses wiring that is electrically coupled via insulated feed-throughs (not shown) to the electrodes 102-1, 102-2, 102-3, the pressure sensor 104, the metal body of the drill collar/drill bit (which is used as a measuring electrode for streaming potential measurements), and the metal body 101 of the drill collar section 15F (which is used as a reference electrode for streaming potential measurements). The drilling fluid flows through the center of the annular chassis 107 as shown by the arrows 108. The annular chassis 107 also preferably includes interface electronics and telemetry electronics which interface to an MWD mud pulse telemetry system located in a separate drill collar. The MWD mud pulse telemetry system generates oscillating pressure waves that propagate upwards inside the drill string, and which are detected by a pressure sensor mounted on the drilling rig. The mud pulse telemetry system encodes the downhole measurements, which are decoded by the surface-located data processing equipment (e.g., a processor and associated data storage). The data processing equipment receives data signals representative of the streaming potentials measured by the electrodes as well data signals representative of the pressure measured by the pressure sensors. Such data signals are analyzed to obtain answer products as discussed below.

The streaming potential values measured by the electrodes are passive voltage readings, which can be made in a highly resistive borehole by using high impedance electronics. In wells drilled with oil-based mud, the electrodes need to be as large as possible and placed as close as possible to the formation to reduce electrode impedance.

It will be appreciated by those skilled in the art that in order to properly analyze the data signals derived from the electrodes and/or pressure sensor of the bottom hole assembly 100, a model of mudcake built up during drilling should be included in the forward model. Drilling muds are designed to prevent significant loss of borehole fluid by forming a nearly impermeable barrier —mudcake—on the borehole wall. The mudcake consists of clays and fine particles that are left behind when mud invades a permeable formation. Accurate models of mudcake formation and mud filtration such as disclosed in E. J. Fordham and H. K. J. Ladva, "Crossflow Filtration of Bentonite Suspensions", Physico-Chemical Hydrodynamics, 11(4), 411–439 (1989) can be utilized. With an appropriate model, the streaming potential information derived from the electrodes and/or pressure sensor of the bottom hole assembly 100 can yield various answer products that are applicable to a wide variety of applications such as drilling safety and formation evaluation. For example, the applications within drilling safety include the early detection of under-balanced condition in over-pressured zones, early detection of fluid loss through fractures and faults, and the estimation of formation pressure. In other examples, the applications within formation evaluation include the estimation of formation permeability and the evaluation of fractures.

Figure 3:
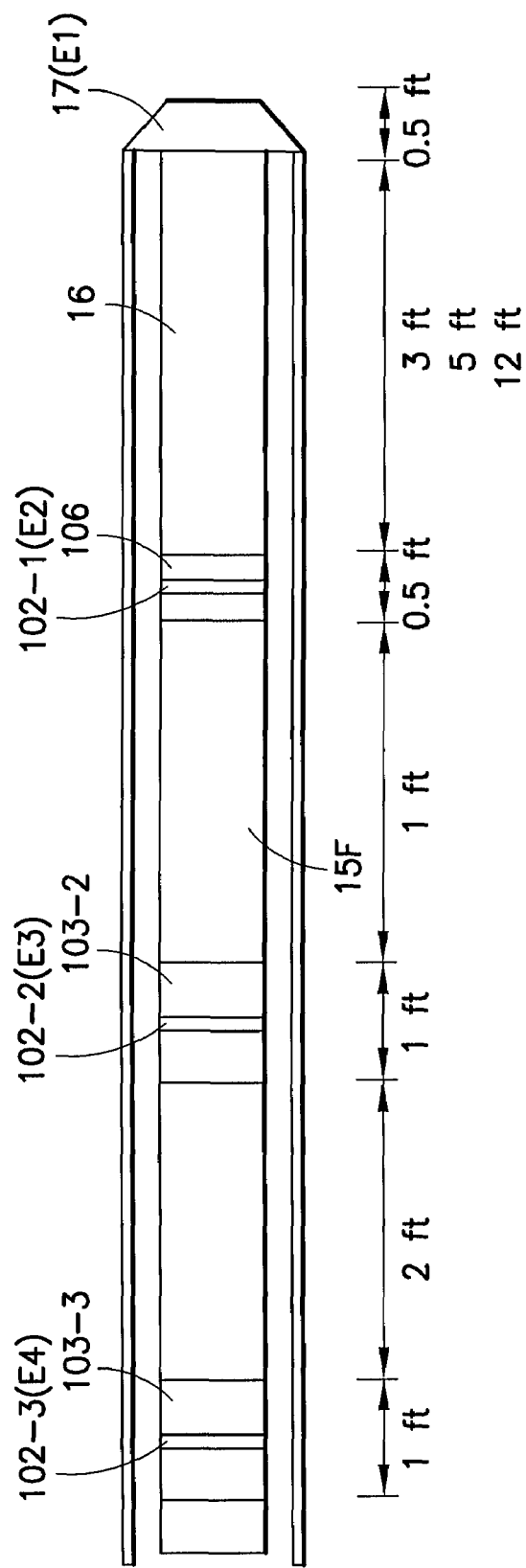
FIG. 3 is schematic representing a forward model of an exemplary bottom hole assembly that embodies a logging-while-drilling apparatus in accordance with the present invention.

An exemplary model is illustrated in the schematic diagram of FIG. 3. In this model, the electrode 102-1 (referred to below as electrode "E2") is located at the mid-point of a 0.5 ft long isolation joint 106 with the electrodes 102-2 and 102-3 (referred to below as electrodes "E3" and "E4", respectively) located in the midpoint of 1 ft long surface insulating sections 102-2, 102-3, which are offset by 1 ft and 4 ft, respectively, from the top of the insulation joint 106. Three different lengths (3 ft., 5 ft and 12 ft) of the drill collar 16 are used. The drill collar/drill bit is referred below as electrode E1. The metal body of the drill collar section 15F defines a reference electrode. The borehole is a vertical well. The conductivity of the formation is 1 S/m, the conductivity of the annulus is 10 S/m, and the conductivity of the drill collar 16 and the drill bit 17 is $10^7$ S/m. The mud pump and the mud pulse telemetry cause the bottom-hole pressure to oscillate. The mud pulse telemetry system can create pressure pulses of a few hundred psi (pounds per square inch) at frequencies from below 1 Hz to above 20 Hz. The difference between the bottom hole pressure and the formation is taken to be $$p = p_0 + p_1 \sin\left(2\pi \frac{t}{T}\right)$$

where the initial pressure $p_0$ is assumed to be 500 psi as an example of over-balanced drilling, and is assumed to be −500 psi as an example of under-balanced drilling. The oscillating pressure from the mud pulse telemetry system is $p_1$, which is assumed to be is 35 psi, and the period of the mud pulse signal is T, which is assumed to be 1 second. In the following examples, the rate of penetration of the drill bit is assumed to be constant at 33 ft/hr till the drilling stops. The drill bit and the drill collars located above it are assumed to be in an impermeable formation (12A of FIG. 1) until time t=0, when the drill bit cuts into a permeable formation (12B of FIG. 1). For times t<0, there is no streaming potential because there is no fluid flowing into, or out of, the impermeable formation. For times t>0, the fluid in the borehole flows into the permeable formation (over-balanced situation), or fluid from the permeable formation flows into the borehole (under-balanced situation). The amount of permeable formation exposed to the borehole is given by the rate of penetration multiplied by the time, t. At time t=800 seconds, the drilling stops with the drill bit having penetrated 7.3 ft into the permeable formation; but the mud pump and the mud-pulse telemetry continue to operate. In the over-balanced case, a mudcake continues to form and reduces the flow of fluid into the formation. In the under-balanced case, the fluid continues to flow out of the formation since mudcake cannot form.

Figure 4:
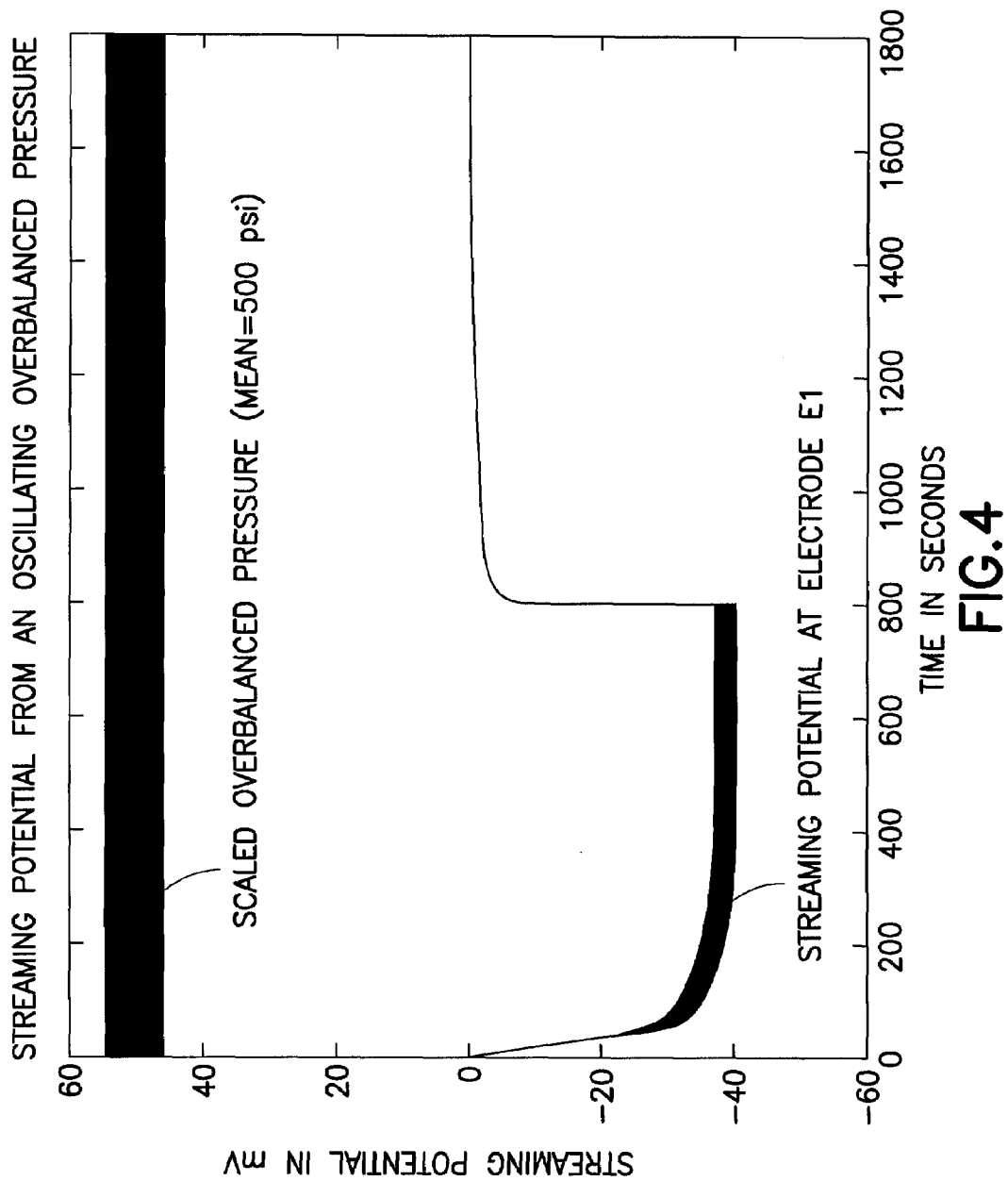
FIG. 4 is a plot of an oscillating streaming potential signal measured at electrode E1 and an over-balanced pressure for the model of FIG. 3.
Figure 5:
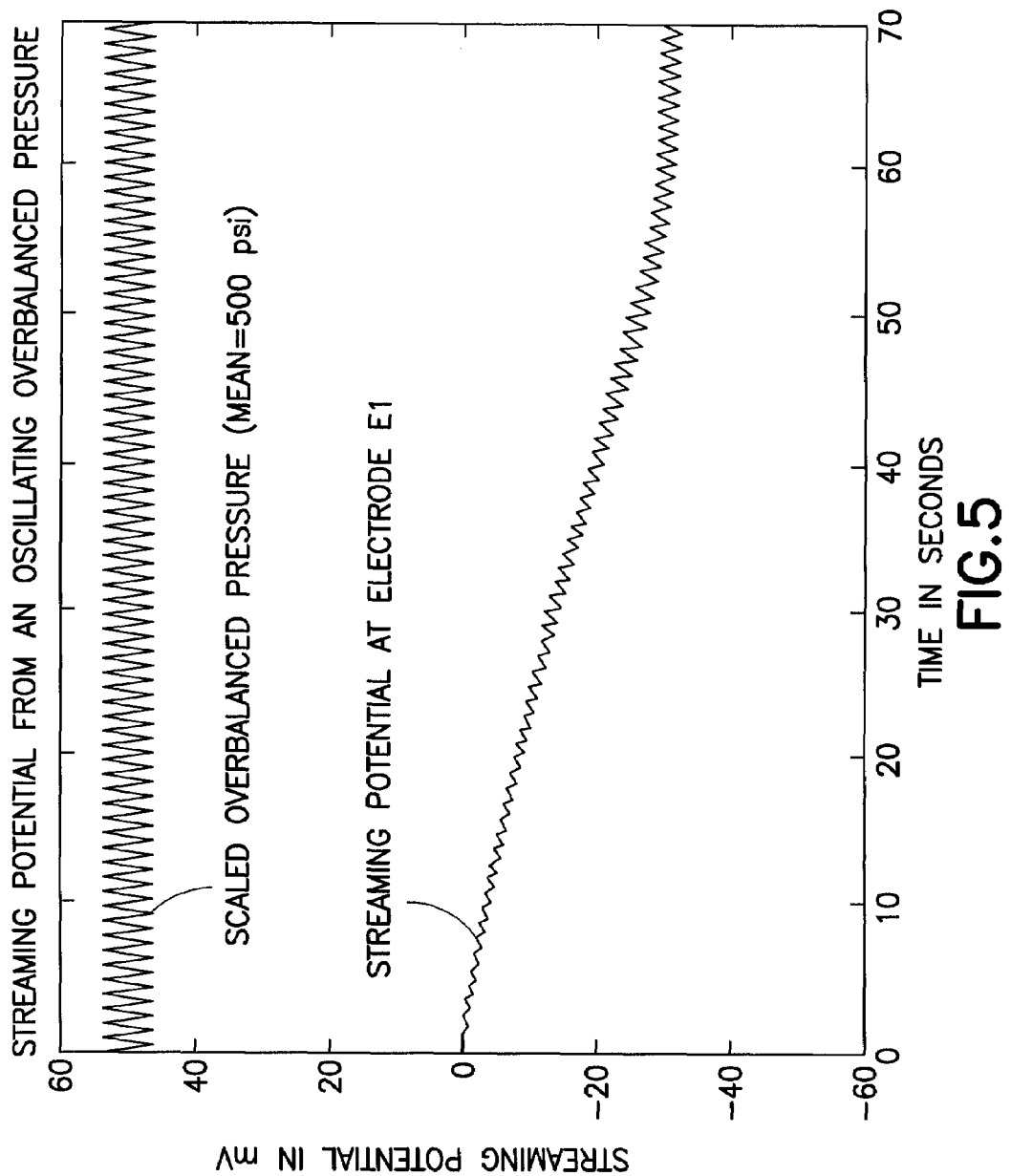
FIG. 5 is a section of the plot of FIG. 4 in an expanded time scale.

An oscillating streaming potential signal may be derived from a differential voltage measurement (block 601 of FIG. 6) between the reference electrode and one of the four electrodes (e.g., E1, E2, E3, or E4), which is herein referred to as the "measuring electrode". For example, an oscillating streaming potential signal derived from the drill collar/drill bit (electrode E1) and an overbalancing pressure is shown in the graph of FIG. 4. A section of FIG. 4 is shown in expanded time scale in FIG. 5. Between time t=0 and t=800 seconds, the drill bit cuts into the permeable formation (12B). At t=800 seconds, electrodes E1, E2, and E3 are in the permeable formation, while E4 remains in the impermeable formation.

In the over-balanced case, mud filtrate invades the permeable formation, producing a streaming potential. Most of the invasion occurs at the cutting face of the drill bit, which continuously removes mudcake. Behind the drill bit's cutting face, mudcake forms on the borehole wall and inhibits further invasion. When the drilling stops at t=800 seconds, the invasion also stops, and the streaming potential rapidly decreases.

In the under-balanced case, formation fluids flow into the wellbore along the entire length of the borehole in the permeable formation, as well as at the cutting face of the bit. Because mudcake cannot form, the streaming potential does not decrease once the drilling stops.

Figure 6:
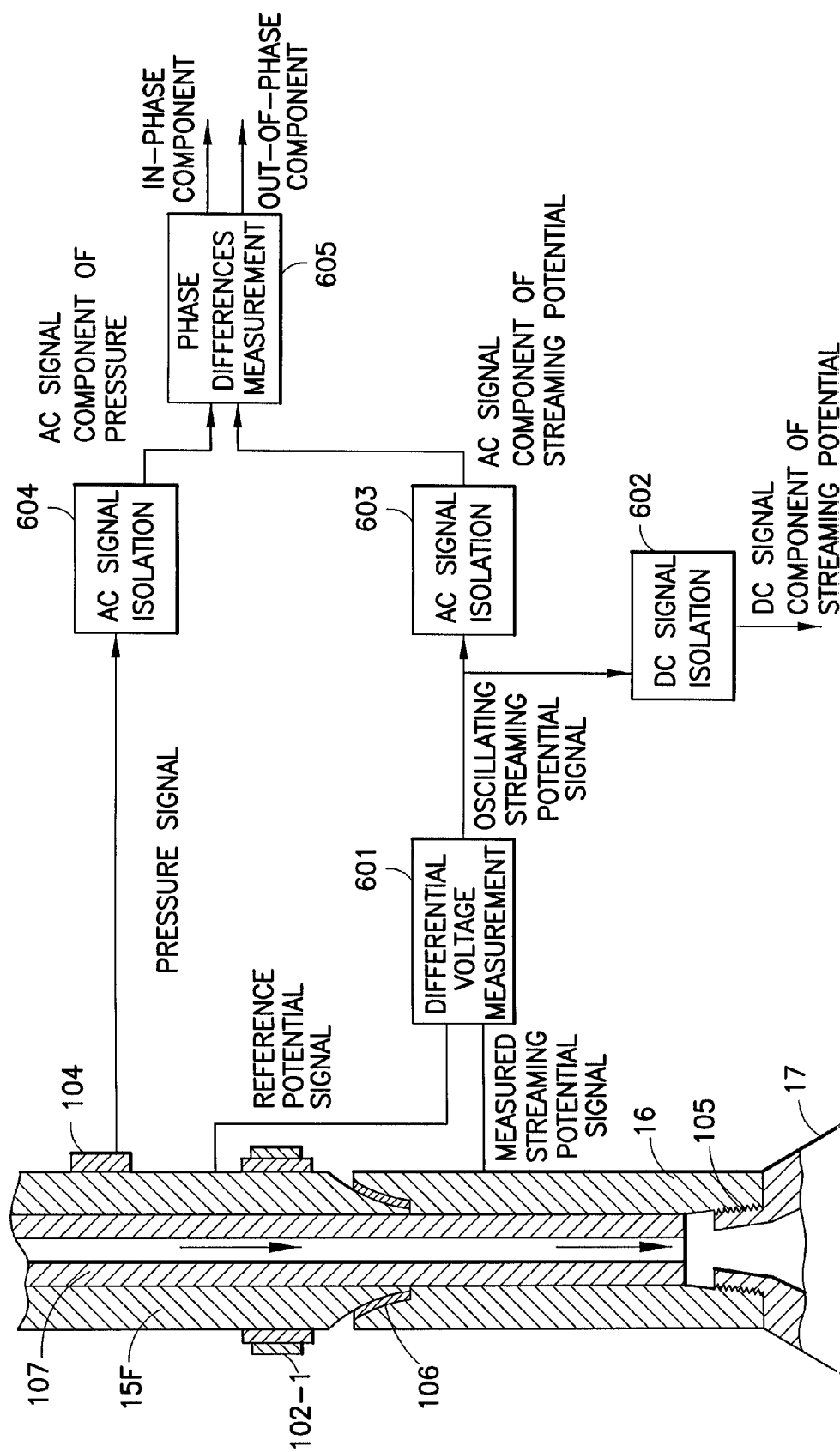
FIG. 6 is a schematic diagram of the signal processing operations that derive the various components of the streaming potential signals measured by the logging-while-drilling apparatus of FIGS. 1, 2 and 3.

Alternatively, separate DC and AC components of the oscillating streaming potential signal can be acquired as shown in FIG. 6. The DC component is acquired in block 602 by averaging the oscillating streaming potential signal output by the differential voltage measurement of block 601 over time. The AC component is acquired in block 603 by filtering out the DC component (and other unwanted components) of the oscillating streaming potential signal output by the differential voltage measurement of block 601. Furthermore, the in-phase component and the out-of-phase component of the streaming potential signal (hereinafter referred to as AC components) can be acquired in block 605 by synchronous detection of the AC component of the streaming potential signal (output by block 603) with the AC component of the bottom hole pressure measured by the pressure sensor (output by block 604). The AC component of the bottom hole pressure is acquired in block 604 by filtering out the DC component (and other unwanted components) of the pressure signal output by the pressure. Importantly, the AC of the oscillating streaming potential signal are less subject to noise contamination than the DC components of the oscillating streaming potential signal.

The origin of the out-of-phase component of the streaming potential signal can be understood in the following way. The oscillating bottom hole pressure will diffuse into the formation. At an interior point in the formation the pressure will have a phase difference with the bottom hole pressure. The phase difference depends on the distance to the borehole and on the formation permeability and the fluid properties. The streaming current at an interior point will be in phase with the pressure gradient at that point and have a phase difference with the bottom hole pressure. The streaming current at each interior point gives a contribution to the streaming potential at the measuring electrode; the contribution is in phase with the pressure gradient at the interior point. The streaming potential at the measuring electrode is the integral of the contributions from all points in the formation. Therefore, there will exist an out-of-phase component of the streaming potential signal.

Figure 7A:
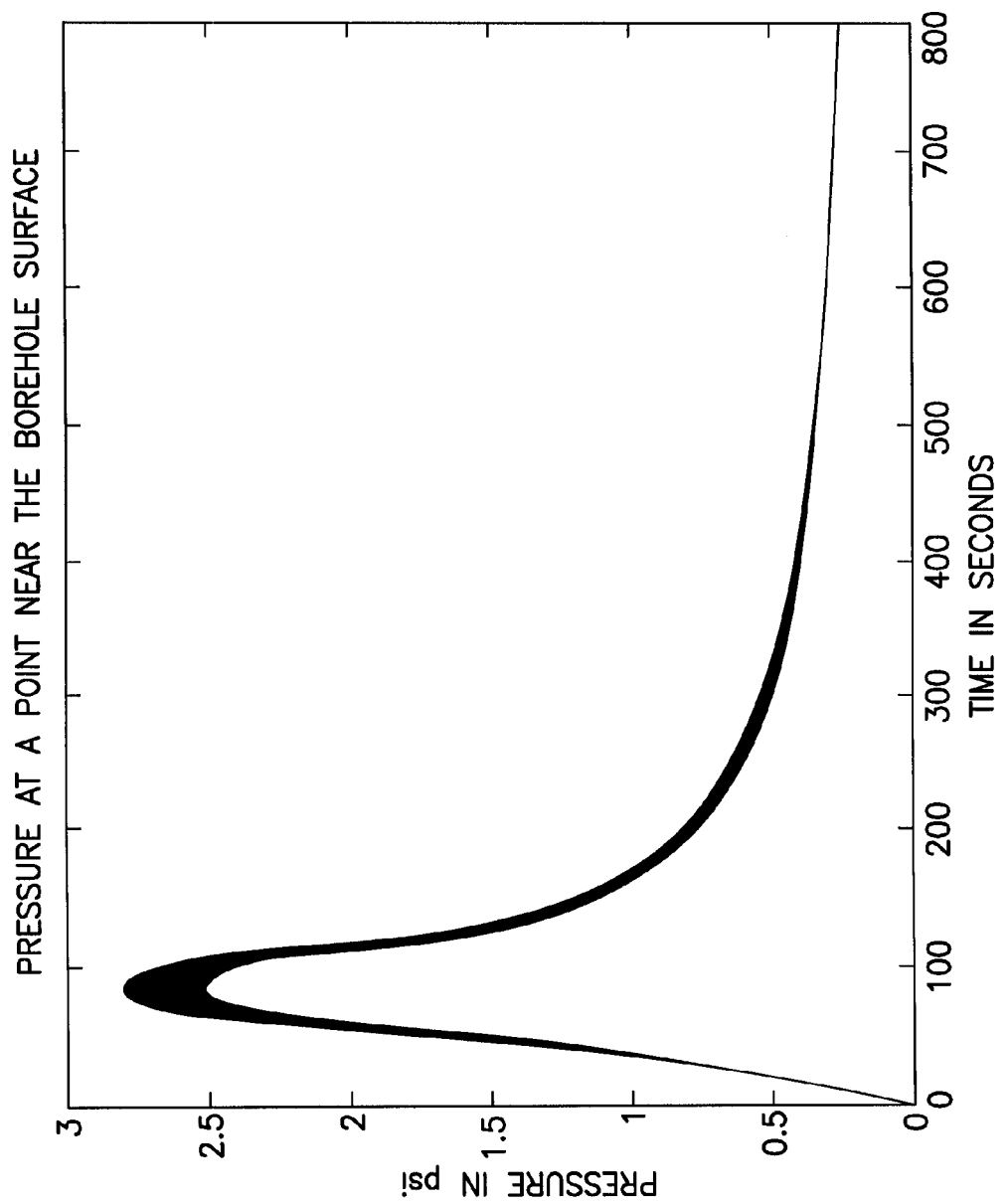
FIG. 7A is a plot of pressure at a point near the borehole surface.

Since the pressure is governed by the diffusion equation rather than the wave equation, the response of the pressure at some distance away from the source becomes diffuse. At large distance away, the detailed information about the source, both spatially and temporally, will be lost in the pressure. Therefore, the oscillatory part of the pressure should diminish with increasing distance to the source of the pressure disturbance. The pressure at a point near the borehole surface is plotted in FIG. 7A, and the corresponding pressure at an interior point of the formation away from the borehole surface is plotted in FIG. 7B. It can be seen the amplitude of the oscillatory part as a percentage of the DC part does decrease significantly as one moves away from the source. Consequently, the AC component of the streaming potential has shallower depths of investigation than the DC component.

The DC, the AC in-phase component, and the AC out-of-phase components of a streaming potential signal measured by the electrode E1 are shown in FIG. 8. The in-phase and out-of-phase components are plotted at different scales from the DC component, with the AC components multiplied by a factor of 10 for clarity. These AC components saturate earlier than the DC component and decline more rapidly when the drilling stops. These properties reflect the short-range nature of the AC components of the streaming potential signal.

The phase difference between the bottom hole pressure and the streaming potential depends on formation permeability. The potential use of the phase difference in the determination of formation permeability will be discussed in a later section.

The streaming potential signals measured by the four electrodes E1, E2, E3 and E4 i are dependent upon the positions of the electrodes along the drill string as well as the position of the isolation joint 16 along the drill string. The streaming potential signals at the four electrodes are shown for over-balanced conditions in FIGS. 9–15. The isolation joint 106 is located different distances from the drill bit 17 in these figures.

Figure 9:
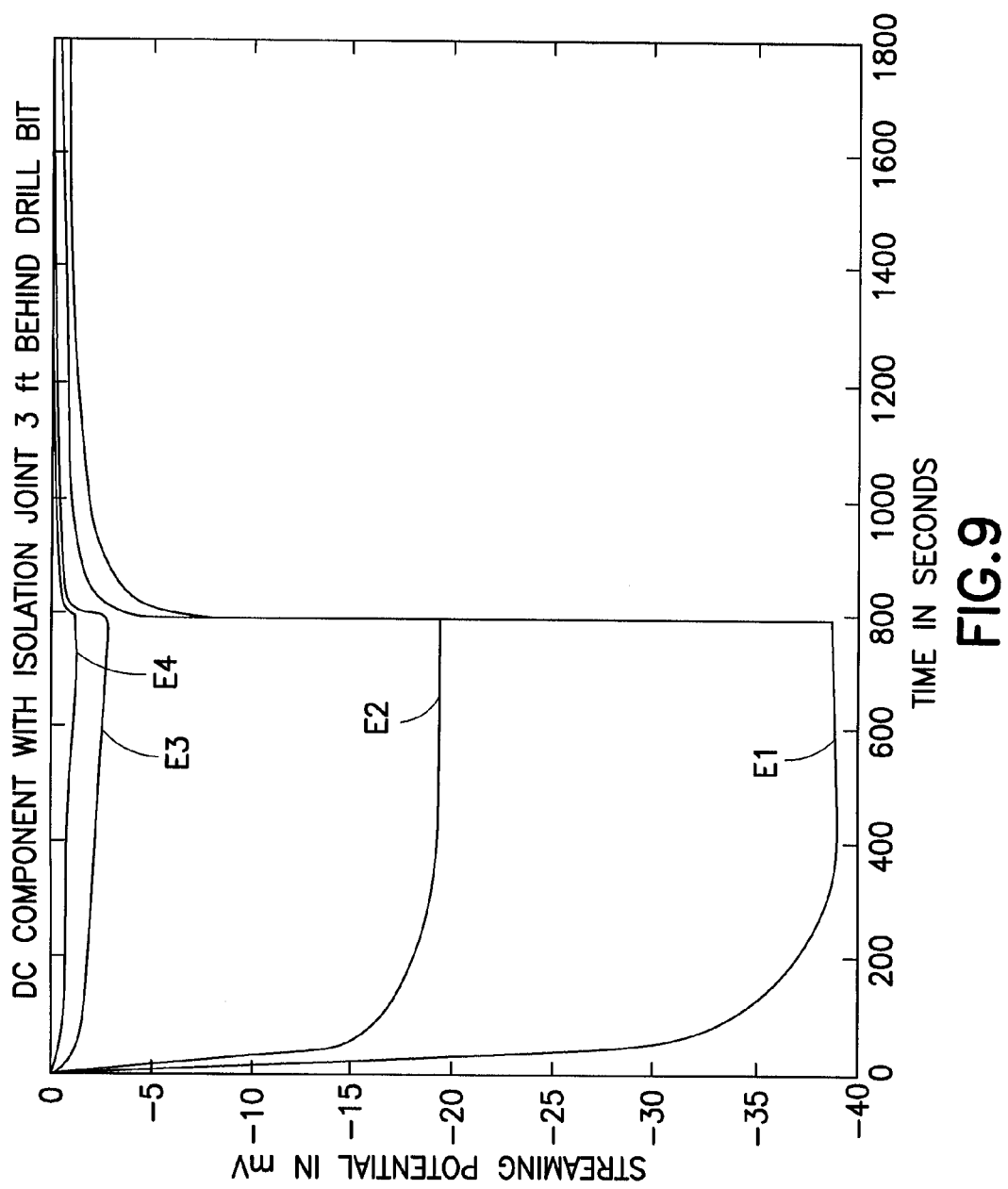
FIG. 9 is a plot of the DC component of the streaming potential signal measured by the electrodes E1, E2, E3 and E4 with the isolation joint located 3 feet behind the drill bit, which is generated by the model of FIG. 3.
Figure 10:
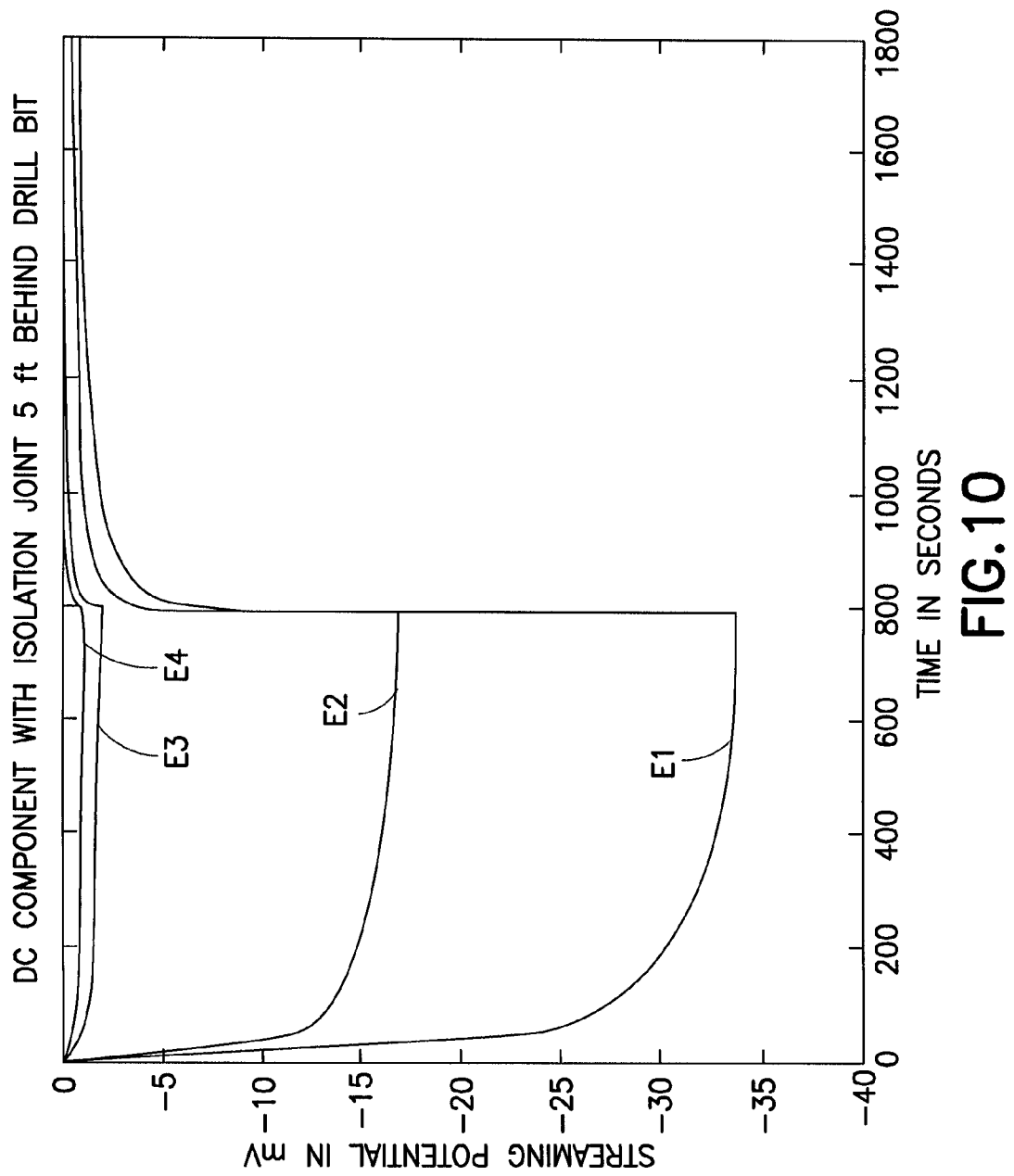
FIG. 10 is a plot of the DC component of the streaming potential signal measured by the electrodes E1, E2, E3 and E4 with the isolation joint located 5 feet behind the drill bit, which is generated by the model of FIG. 3.
Figure 11:
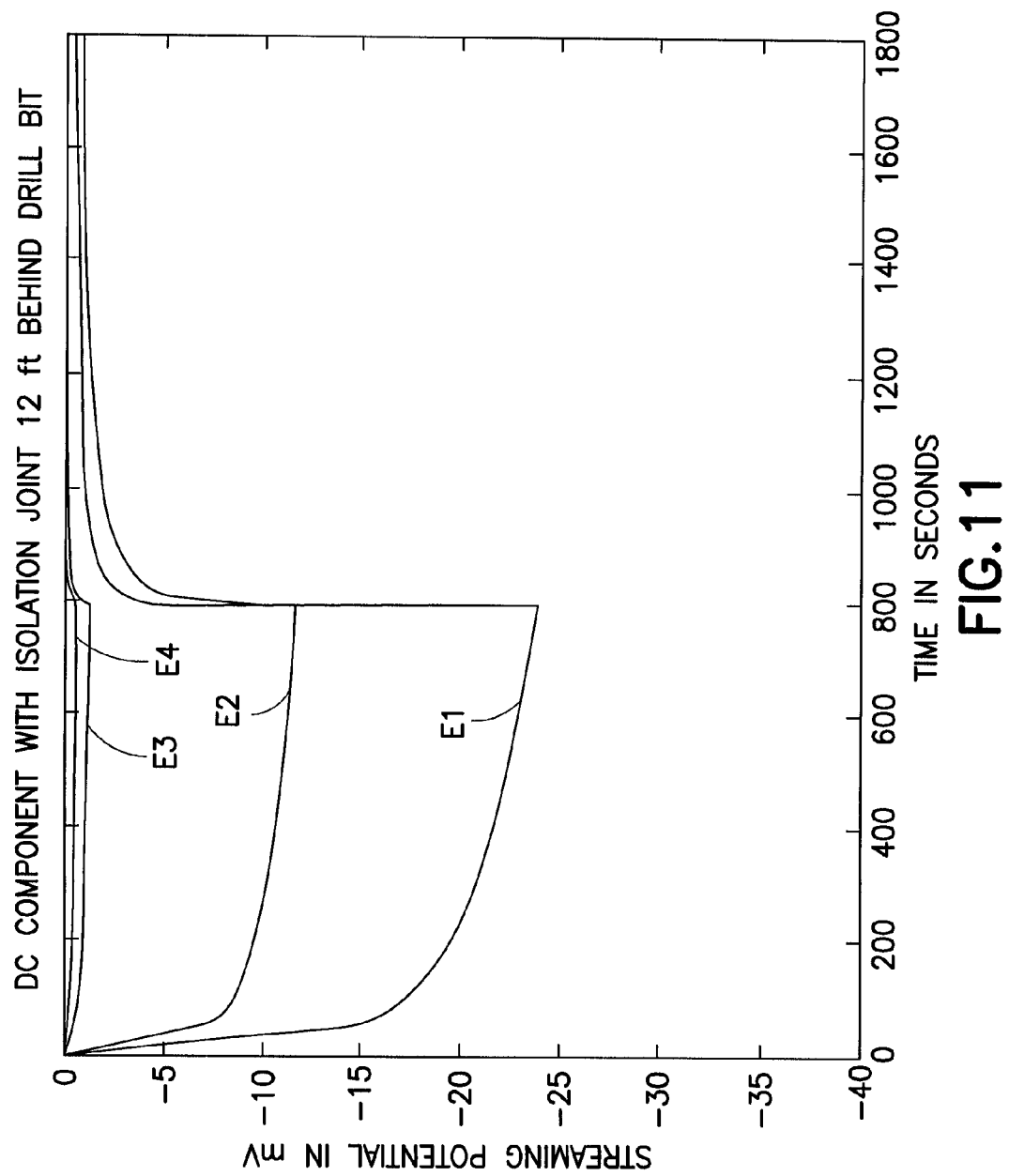
FIG. 11 is a plot of the DC component of the streaming potential signal measured by the electrodes E1, E2, E3 and E4 with the isolation joint located 12 feet behind the drill bit, which is generated by the model of FIG. 3.

The DC signal components are shown in FIGS. 9, 10 and 11, respectively. Increasing spacing between the drill bit 17 and the isolation joint 106 from 3 ft to 12 ft does not cause a large drop in the DC signal amplitude. The signal amplitude for electrode E1 is approximately 38 mV for a 3 ft spacing, and approximately 23 mV for a 12 ft spacing between the bit and the isolation joint. The signal amplitude of electrode E2 is approximately 19 mV for the 3 ft spacing, and 12 mV for the 12 ft spacing. Also note that electrode E2 is in the permeable bed for the 3 ft spacing, but is in the impermeable bed for the 12 ft spacing. This slow decrease in the DC signal amplitudes occurs because the drill bit 17 and the drill collar 16 form an equipotential surface and passively focus the streaming potential electric current away from the borehole. The isolation joint 106 forces the streaming electrical current to return to the drill collar section 15F behind the isolation joint 106. This also explains why the DC amplitudes decrease slowly from E1 to E2. Once the streaming electric current flows beyond the isolation joint 106, it quickly returns to the drill collar 15F. This explains why the amplitude at electrode E3 is much smaller than at E2.

Figure 12:
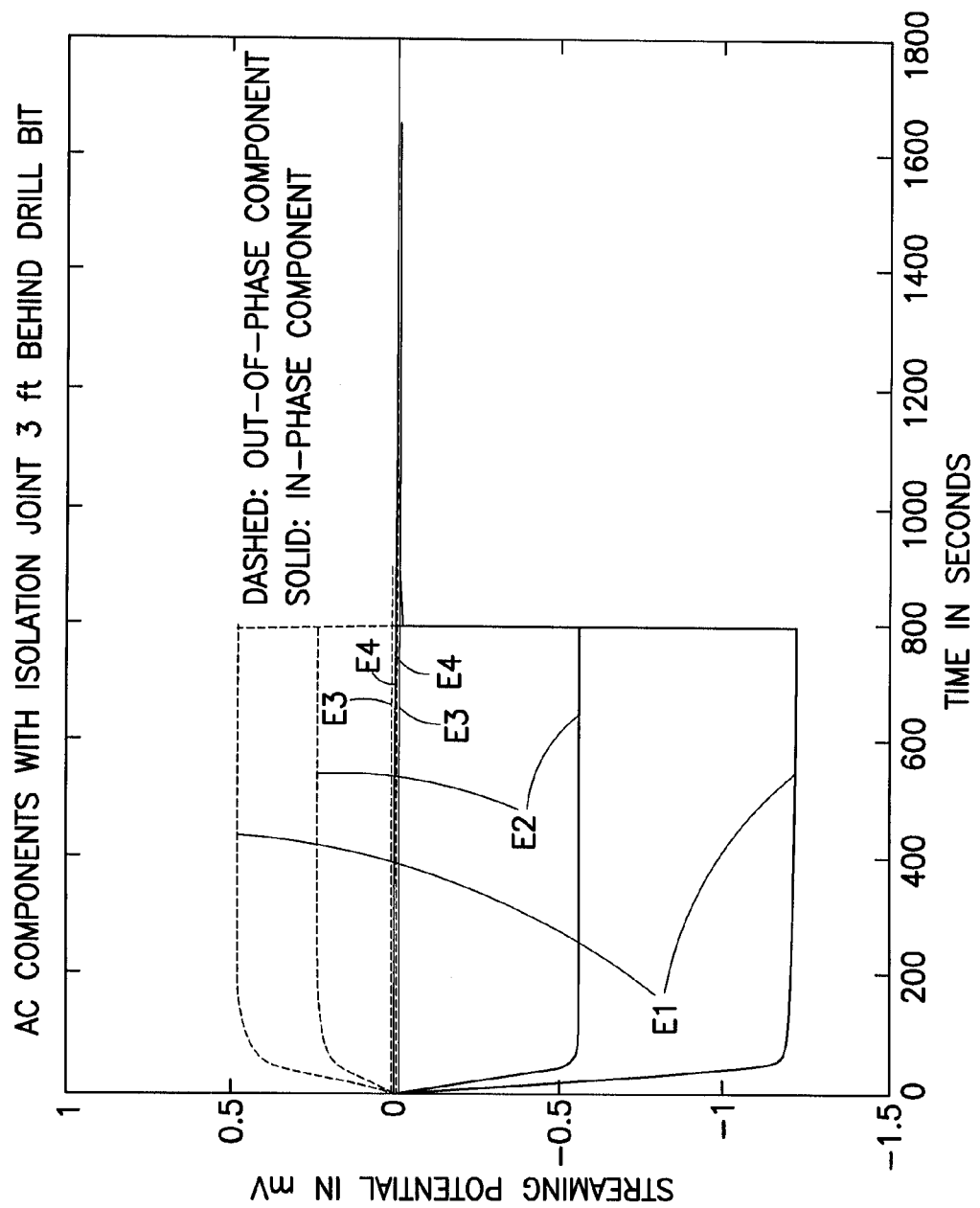
FIG. 12 is a plot of the in-phase and out-of-phase components of the streaming potential signal measured by the electrodes E1, E2, E3, E4 with the isolation joint located 3 feet behind the drill bit, which is generated by the model of FIG. 3.
Figure 13:
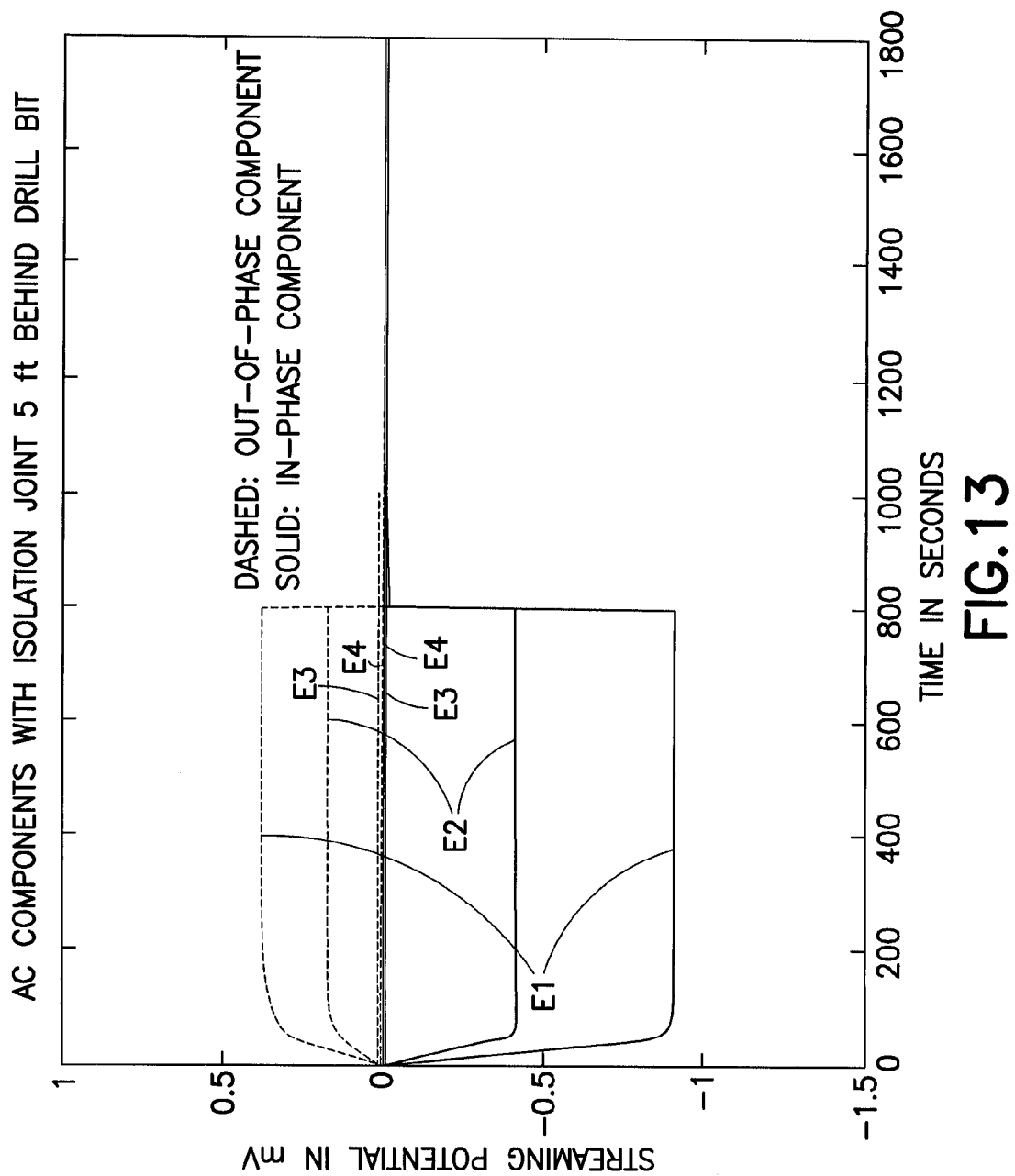
FIG. 13 is a plot of the in-phase and out-of-phase components of the streaming potential signal measured by the electrodes E1, E2, E3, E4 with the isolation joint located 5 feet behind the drill bit, which is generated by the model of FIG. 3.
Figure 14:
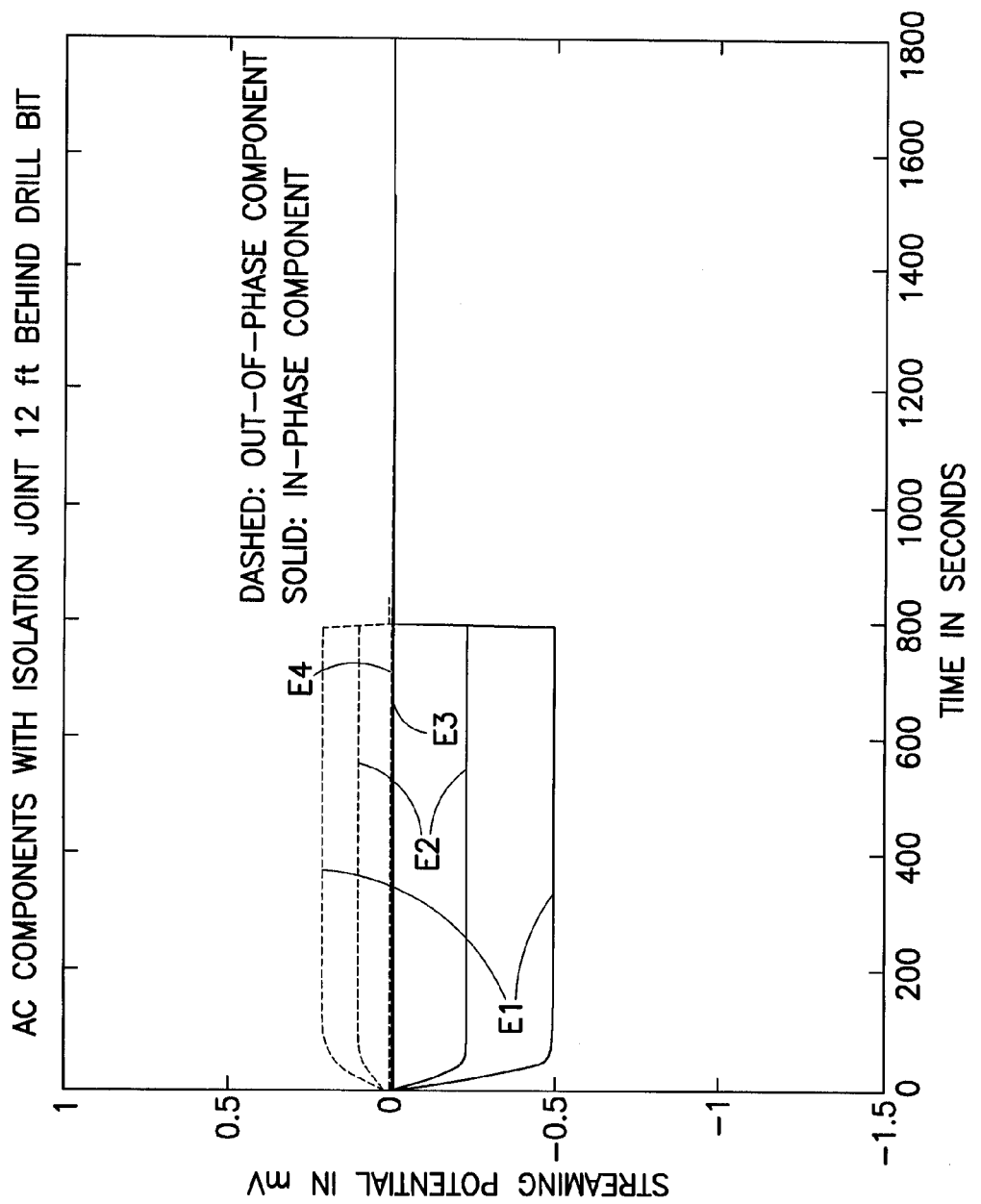
FIG. 14 is a plot of the in-phase and out-of-phase components of the streaming potential signal measured by the electrodes E1, E2, E3, E4 with the isolation joint located 12 feet behind the drill bit, which is generated by the model of FIG. 3.

The AC signal components are shown in FIGS. 12, 13, and 14, respectively. The amplitudes of the AC components decrease slowly with increasing distance between the drill bit and the isolation joint.

Figure 15:
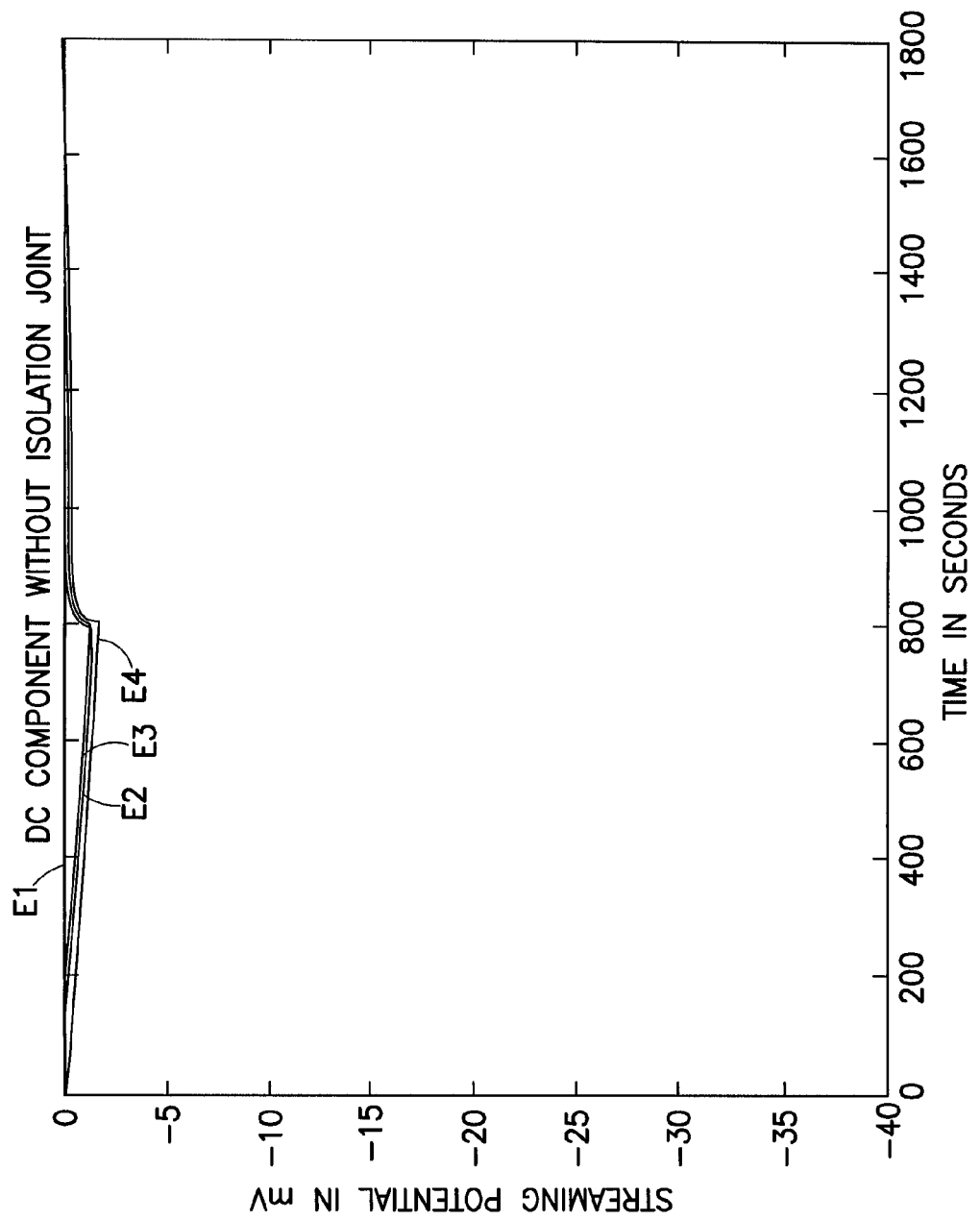
FIG. 15 is a plot of the DC component of the streaming potential signal measured by the electrodes E1, E2, E3, E4 without an isolation joint, which is generated by the model of FIG. 3.

The DC signal components calculated without the isolation joint 106 are shown in FIG. 15. Comparing FIGS. 15 and 9, the amplitudes without the isolation joint are 40 times smaller than with an isolation joint. Thus, an isolation joint is preferably included in the tool design in order to provide good signal strength.

FIGS. 9–15 show that accurate measurements of streaming potential signals can be obtained preferably with an isolation joint located in the drill string. The isolation joint 106 need not be located immediately behind the drill bit 17. Note that when the distance between the isolation joint 106 and the drill bit 17 increased from 3 ft to 12 ft, the magnitude of the streaming potential decreased only by a factor of 2. Thus, it is contemplated that the isolation joint 106 may be placed 20 ft to 30 ft behind the drill bit 17 if desired. This allows a directional drilling system to be located immediately above the drill bit, and the isolation joint to be placed above the directional drilling system. This is an important practical consideration since most offshore wells require a directional drilling system immediately above the drill bit.

Figure 16:
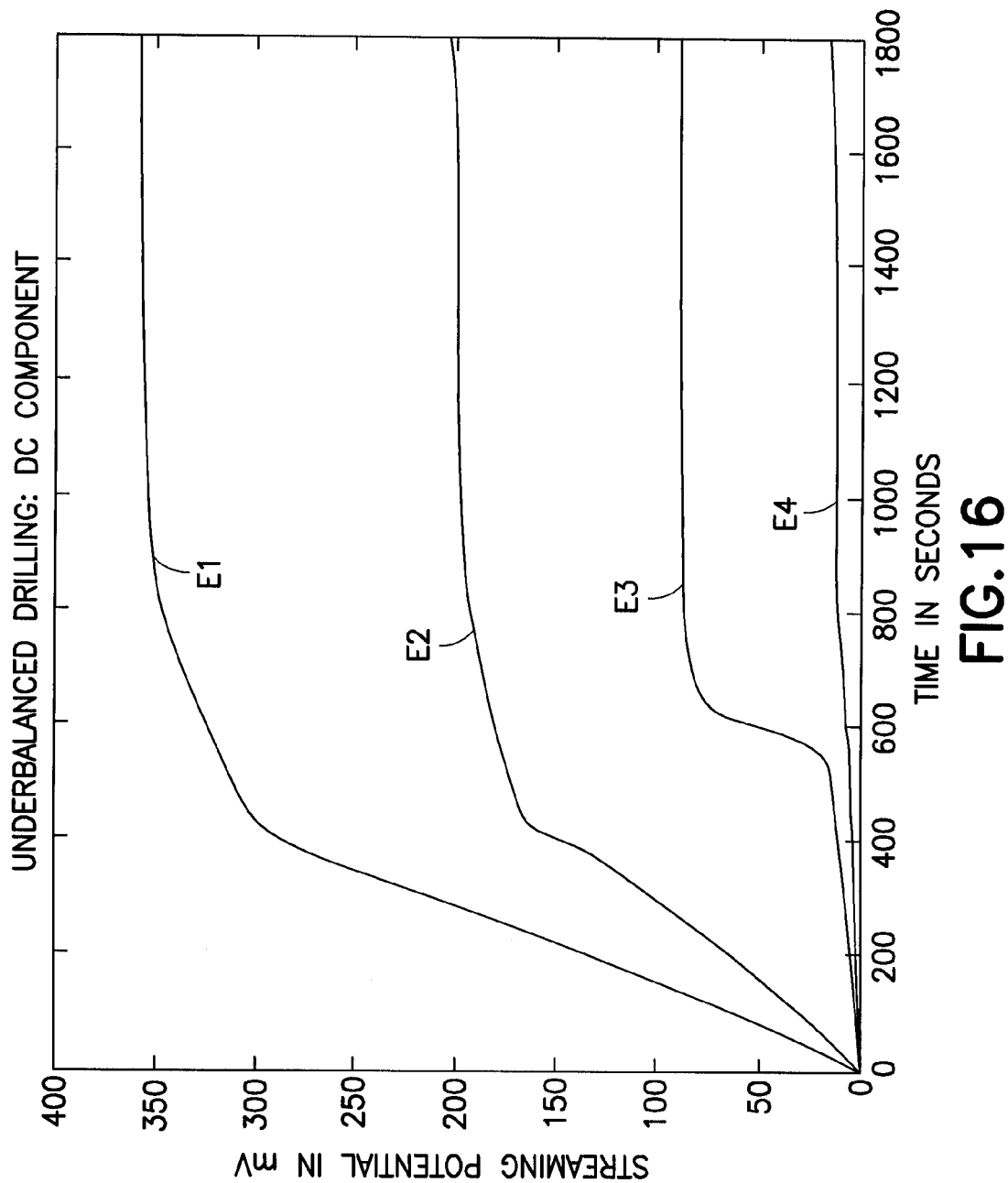
FIG. 16 is a plot of the DC component of the streaming potential signal measured by the electrodes E1, E2, E3 and E4 in conjunction with an under-balanced drilling condition, which is generated by the model of FIG. 3.
Figure 17:
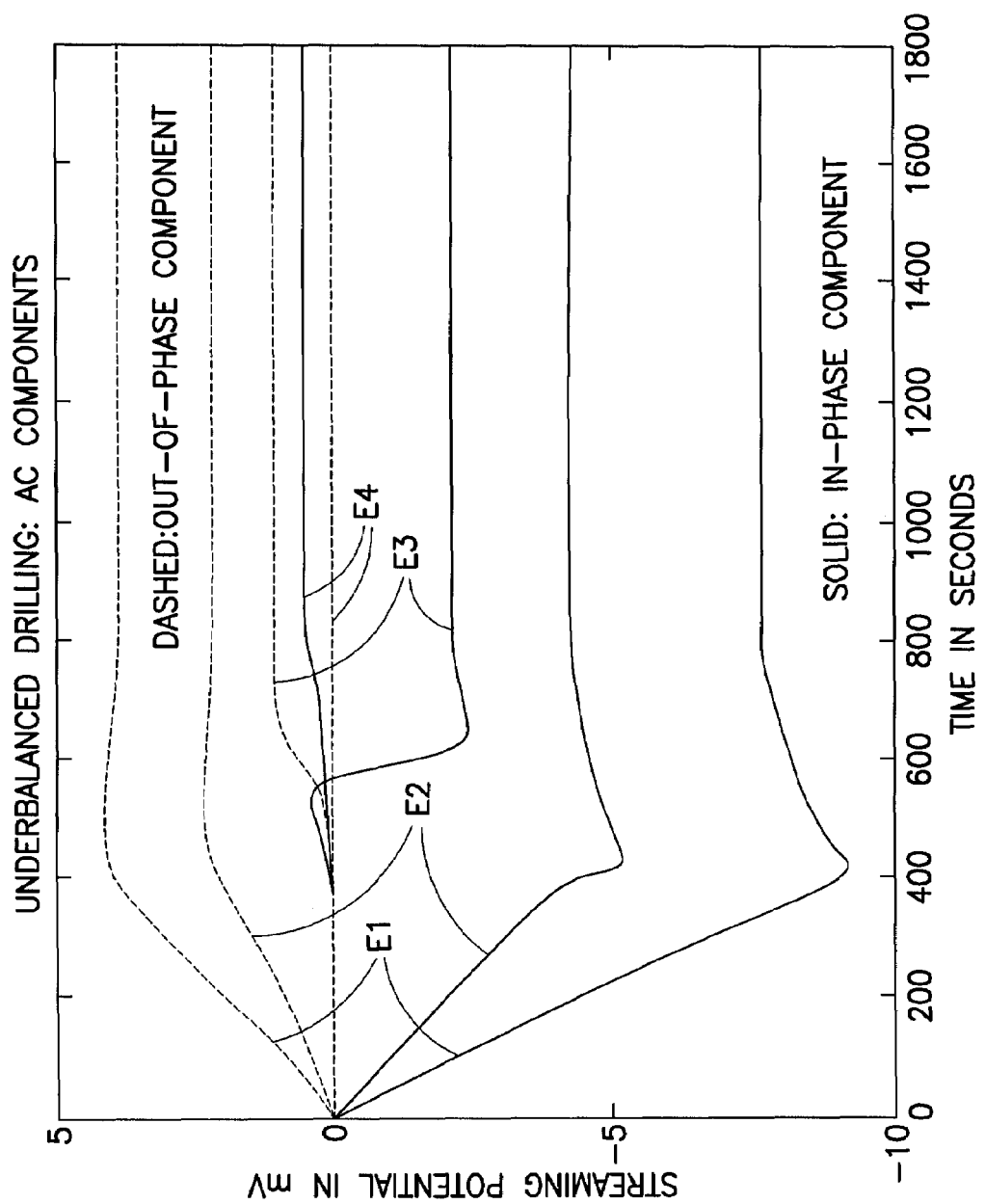
FIG. 17 is a plot of the in-phase and out-of-phase components of the streaming potential signal measured by the electrodes E1, E2, E3 and E4 in conjunction with an under-balanced drilling condition, which is generated by the model of FIG. 3.

In accordance with one aspect of the present invention, the streaming potential signals measured by one or more of the four electrodes E1, E2, E3, E4 of the assembly 100 can be used to detect under-balanced drilling conditions, which is critical for drilling safety. Normally, an over-balanced condition is maintained during drilling. If a formation with unexpectedly high pressure is encountered such that an under-balanced condition exists, the driller must take immediate action to prevent a "blow-out". A "blow-out" can result in the loss of the well, environmental damage, and potentially the loss of life. FIG. 16 shows the DC signal components of the streaming potential signals with the isolation joint 106 located 3 ft behind the drill bit 17. FIG. 17 shows the AC signal components. The detection of under-balanced drilling conditions can be simply derived from the DC signals by detecting a sign reversal in the DC signals. From FIGS. 9 and 16, the sign of a DC signal is negative for over-balanced drilling conditions and positive for under-balanced drilling conditions. The DC signal will go from negative to positive when a transition from over-balanced to under-balanced drilling conditions occurs.

Alternatively, the AC signal components can be used to detect under-balanced drilling conditions. Comparing FIGS. 12 and 17, there is no sign reversal in the AC components when a transition from over-balanced to under-balanced drilling conditions occurs. However, the time duration of the rising period of the streaming potential after entering the permeable zone is very different in the two figures. In the over-balanced case, mudcake rapidly forms on the borehole wall above the drill bit and reduces the amount mud filtrate invasion behind the drill bit's cutting face. Hence, significant filtration only occurs at the cutting face. Increasing the borehole length in the permeable formation 12B does not increase the rate of filtration. In the under-balanced situation, mudcake cannot form. Hence the amount of mud filtrate increases as the length of the borehole in the permeable formation increases. Moreover, when the drilling is stopped at t=800 seconds, the AC signal components rapidly decline for over-balanced drilling conditions (FIG. 12), even though drilling fluid continues to circulate, but remain steady for under-balanced drilling conditions (FIG. 17). Again, the rapid build-up of mudcake in the over-balanced case explains why the streaming potential decreases rapidly at t=800 seconds. Whereas in the under-balanced case, the fluid continues to flow from the formation into the borehole. Finally, the AC signal components at electrode E3 remain very small for over-balanced drilling conditions (FIG. 12), but increase significantly (e.g., at t=600) for under-balanced drilling conditions (FIG. 17). In accordance with the present invention, one or more of these properties can be used as detection criteria for under-balanced drilling conditions.

Figure 18:
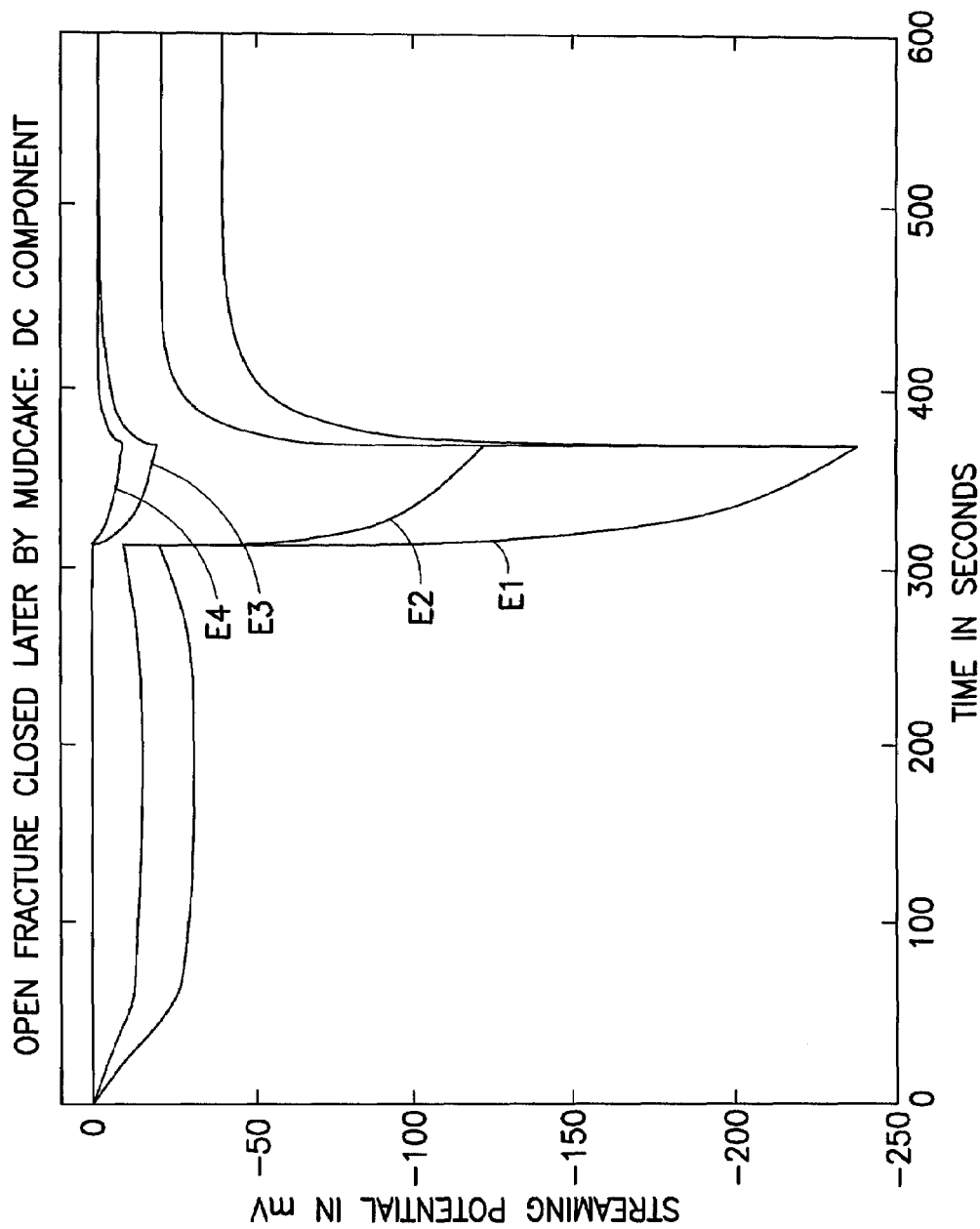
FIG. 18 is a plot of the DC component of the streaming potential signal measured by the electrodes E1, E2, E3 and E4 in conjunction with drilling through an open fracture that is closed later by mudcake, which is generated by the model of FIG. 3.
Figure 19:
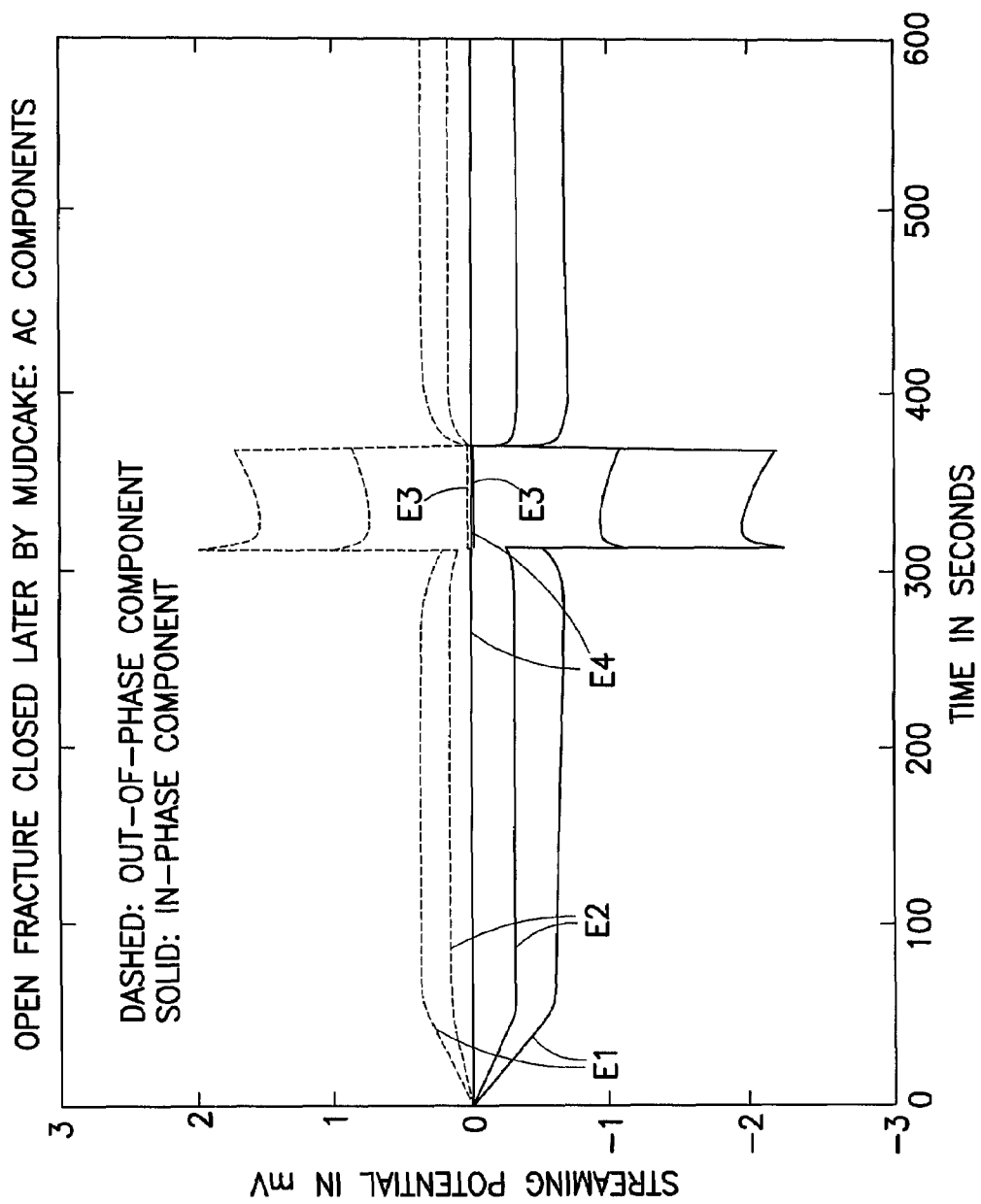
FIG. 19 is a plot of the in-phase and out-of-phase components of the streaming potential signal measured by the electrodes E1, E2, E3 and E4 in conjunction with drilling through an open fracture that is closed later by mudcake, which is generated by the model of FIG. 3.
Figure 20:
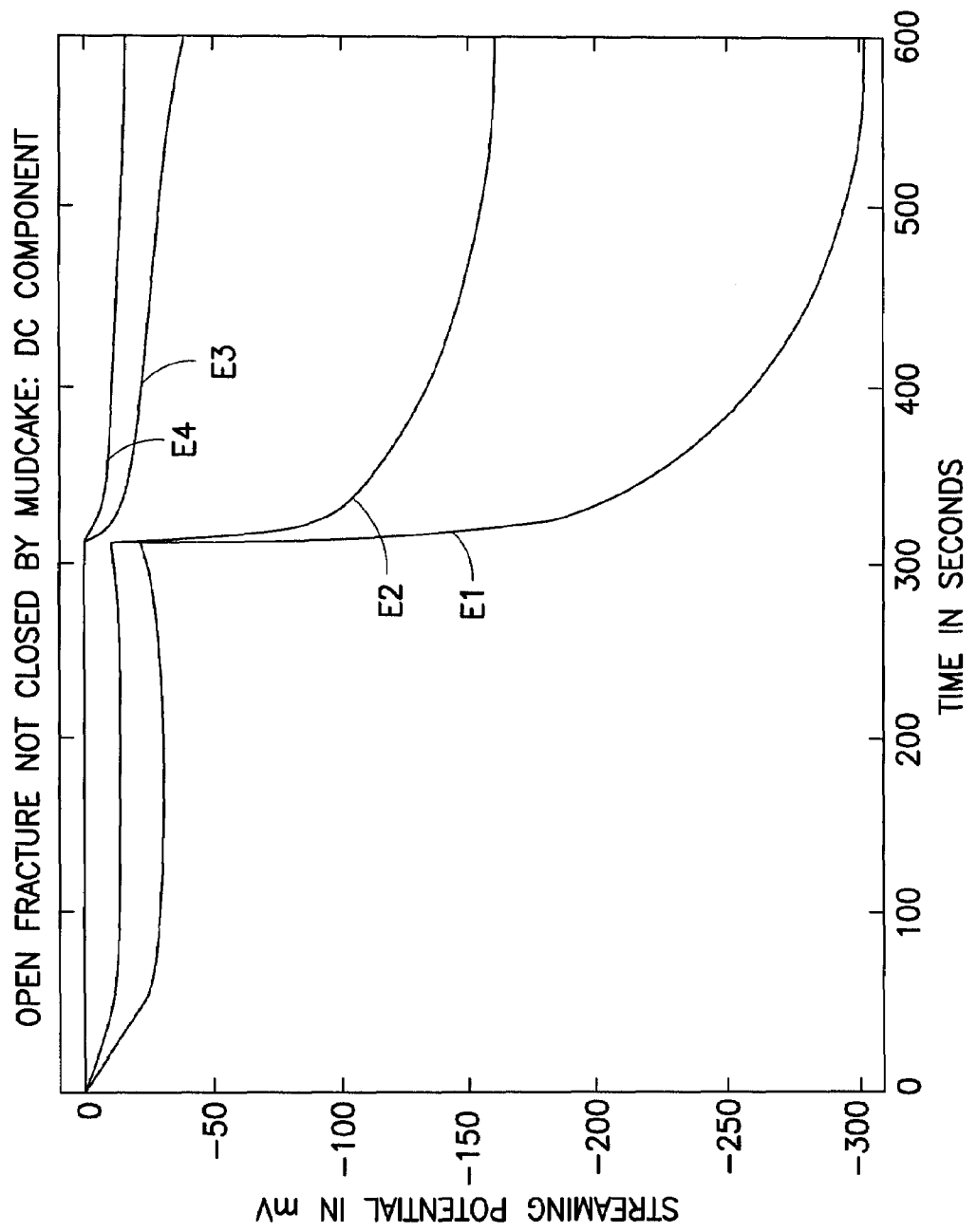
FIG. 20 is a plot of the DC component of the streaming potential signal measured by the electrodes E1, E2, E3 and E4 in conjunction with drilling through an open fracture that is not closed by mudcake, which is generated by the model of FIG. 3.
Figure 21:
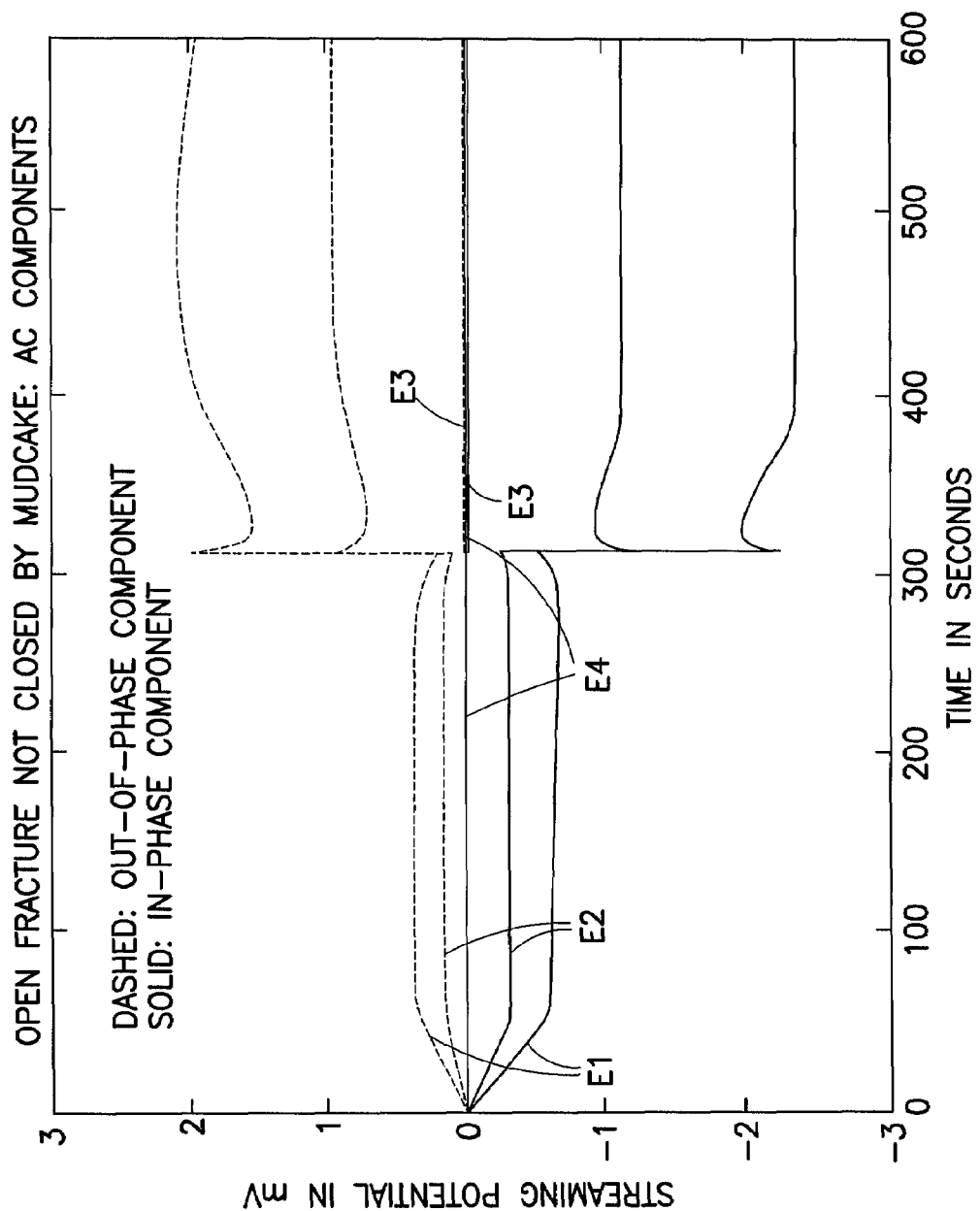
FIG. 21 is a plot of the in-phase and out-of-phase components of the streaming potential signal measured by the electrodes E1, E2, E3 and E4 in conjunction with drilling through an open fracture that is not closed by mudcake, which is generated by the model of FIG. 3.

In accordance with another aspect of the present invention, the streaming potential signals measured by one or more of the four electrodes E1, E2, E3, E4 of the assembly 100 can be used to detect open fractures, which is critical for drilling safety. In particular, there may be sudden fluid loss from natural or induced fractures during drilling, resulting in lost circulation and potentially dangerously low pressures in the borehole. In that case, the streaming potential will rapidly increase as fluids rush into the formation through the open fractures. This fluid loss will not be noticed at the surface until much later. FIG. 18 shows the DC signal components with the isolation joint 106 located 3 ft behind the drill bit 17 in conjunction with an open fracture that is later sealed by mudcake. FIG. 19 shows the AC signal components. FIG. 20 shows the DC signal components if the fracture is not sealed by mudcake and FIG. 21 shows the AC signal components. The fracture is a thin zone of high permeability, and it is penetrated by the drill bit at t=320 seconds. As is evident from FIGS. 18–21, fluid flow increases as the fracture is drilled through, which results in large DC and AC streaming potential signals at electrodes E1 and E2. The DC components are 40 times larger for electrode E1 with the fracture than with the permeable formation (FIG. 9). Similarly, the AC signal components are significantly larger for electrode E1 with the fracture than with the permeable formation (FIG. 12). When the fracture is later sealed by mudcake (at t=380 seconds in FIGS. 18 and 19), the DC components and the AC components revert back to their steady state values after the drill bit moves beyond the fracture. When the facture is not sealed by mudcake (FIGS. 20 and 21), there is no decrease when the drill bit leaves the fracture. In accordance with the present invention, these properties can be used as detection criteria for an open fracture, which is also critical for drilling safety.

Figure 22:
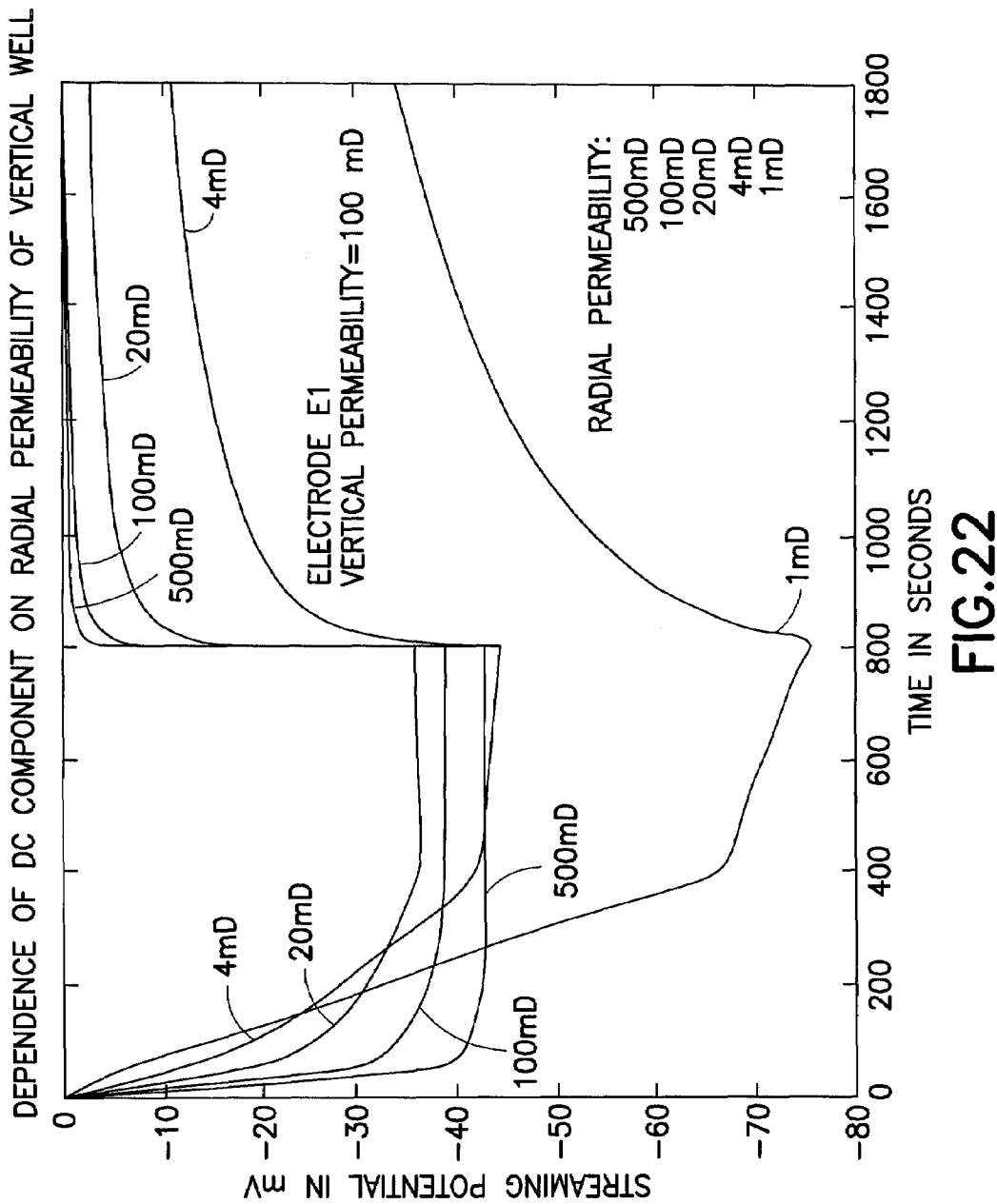
FIG. 22 is a plot of the DC component of the streaming potential signal measured by the electrode E1 over a set of varying radial permeabilities and a vertical permeability of 100 mD, which is generated by the model of FIG. 3.
Figure 23:
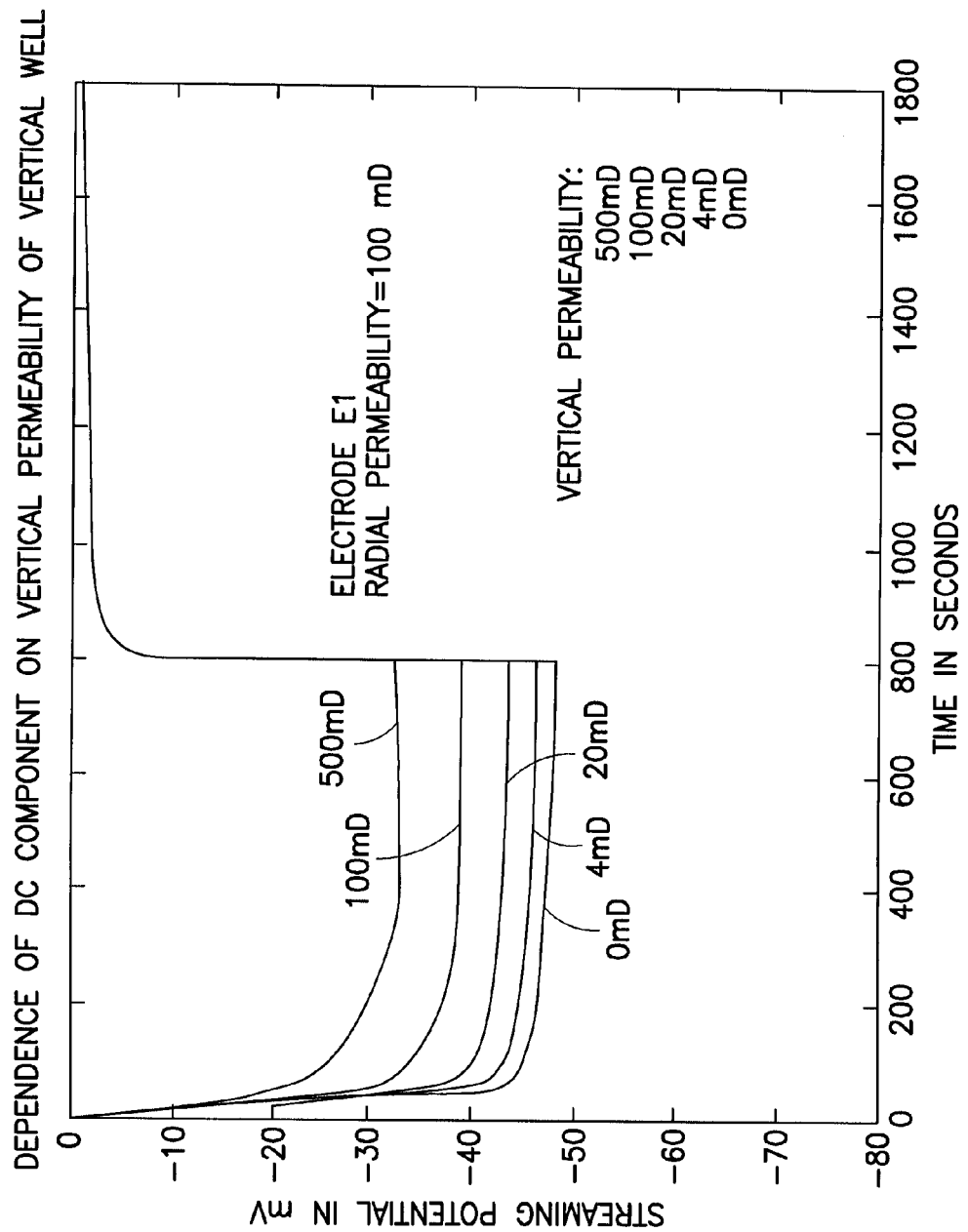
FIG. 23 is a plot of the DC component of the streaming potential signal measured by the electrode E1 over a set of varying vertical permeabilities and a radial permeability of 100 mD, which is generated by the model of FIG. 3.
Figure 24:
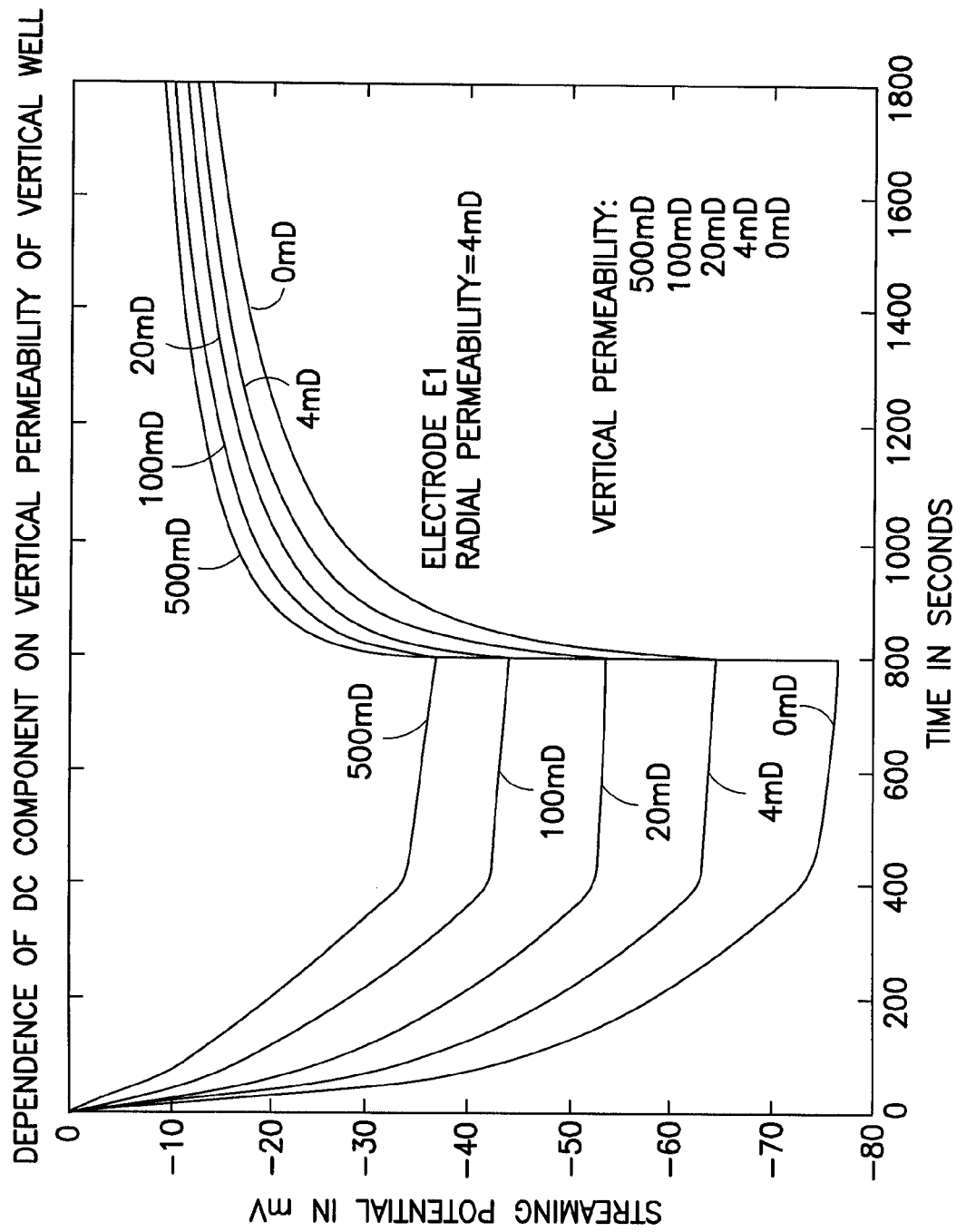
FIG. 24 is a plot of the DC component of the streaming potential signal measured by the electrode E1 over a set of varying vertical permeabilities and a radial permeability of 4 mD, which is generated by the model of FIG. 3.
Figure 25:
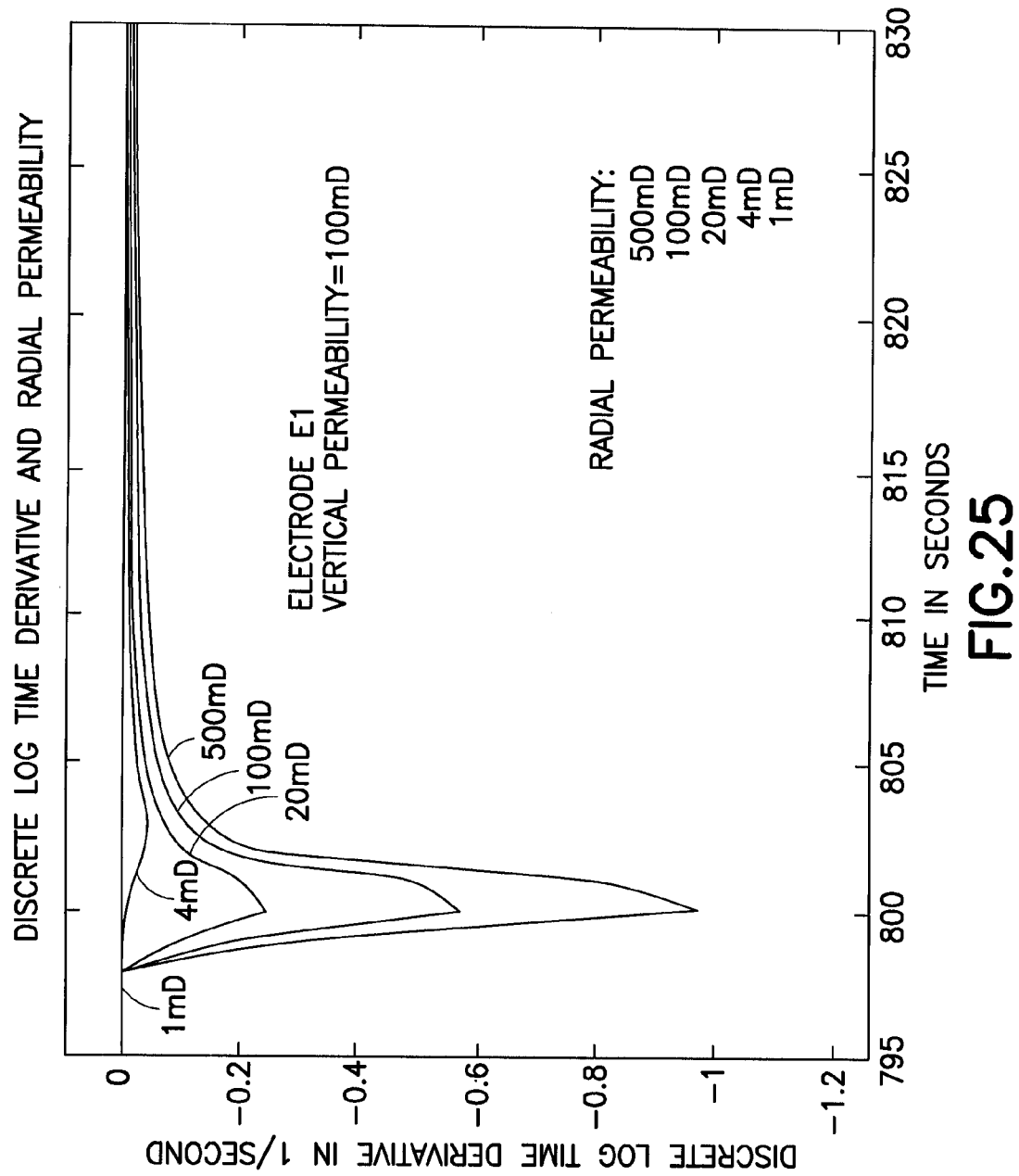
FIG. 25 is a plot of discrete log time derivatives of the DC component of the streaming potential signal measured by the electrode E1 over a set of varying radial permeabilities and a vertical permeability of 100 mD, which is generated by the model of FIG. 3.
Figure 26:
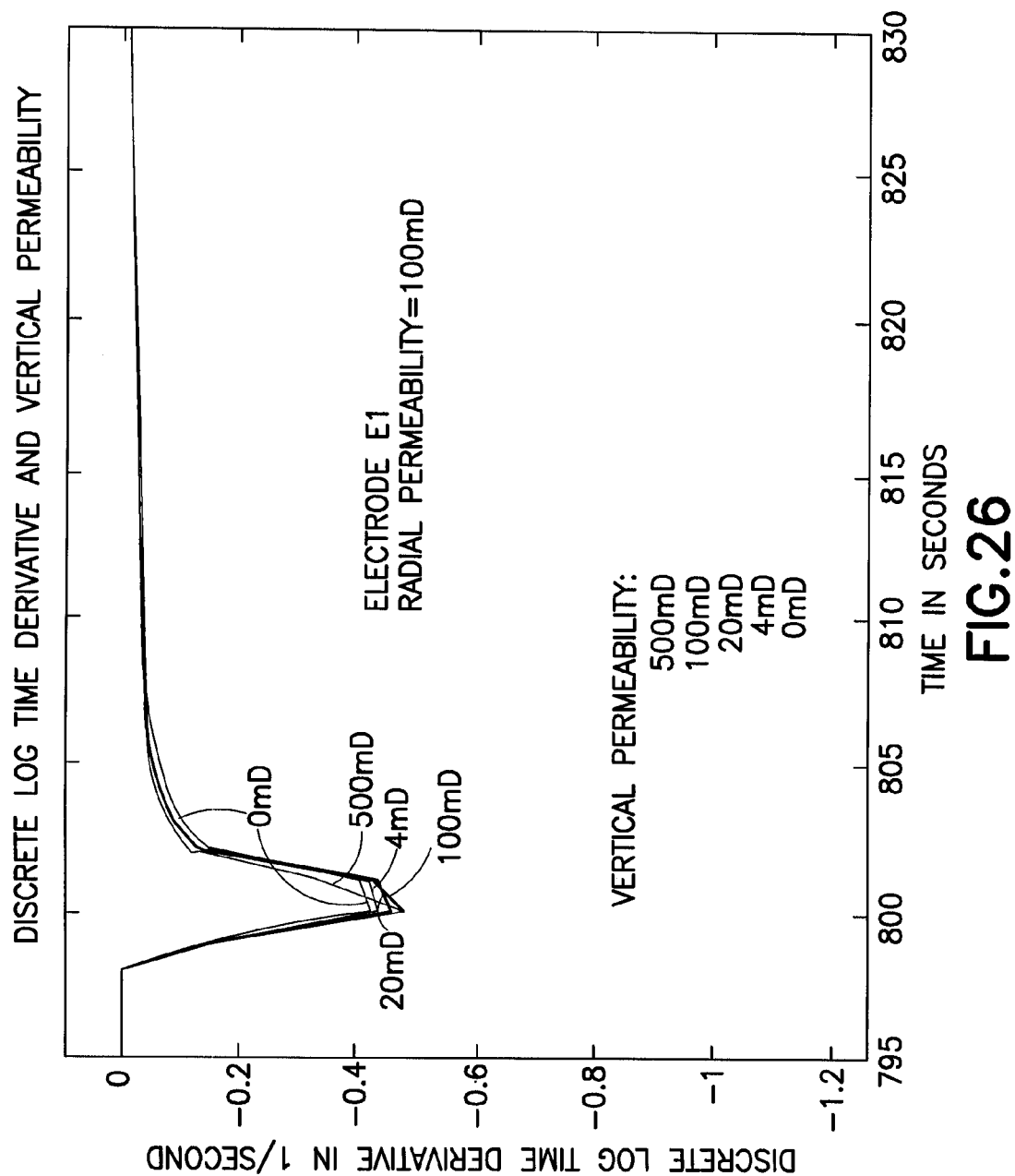
FIG. 26 is a plot of discrete log time derivatives of the DC component of the streaming potential signal measured by the electrode E1 over a set of varying vertical permeabilities and a radial permeability of 100 mD, which is generated by the model of FIG. 3.
Figure 27:
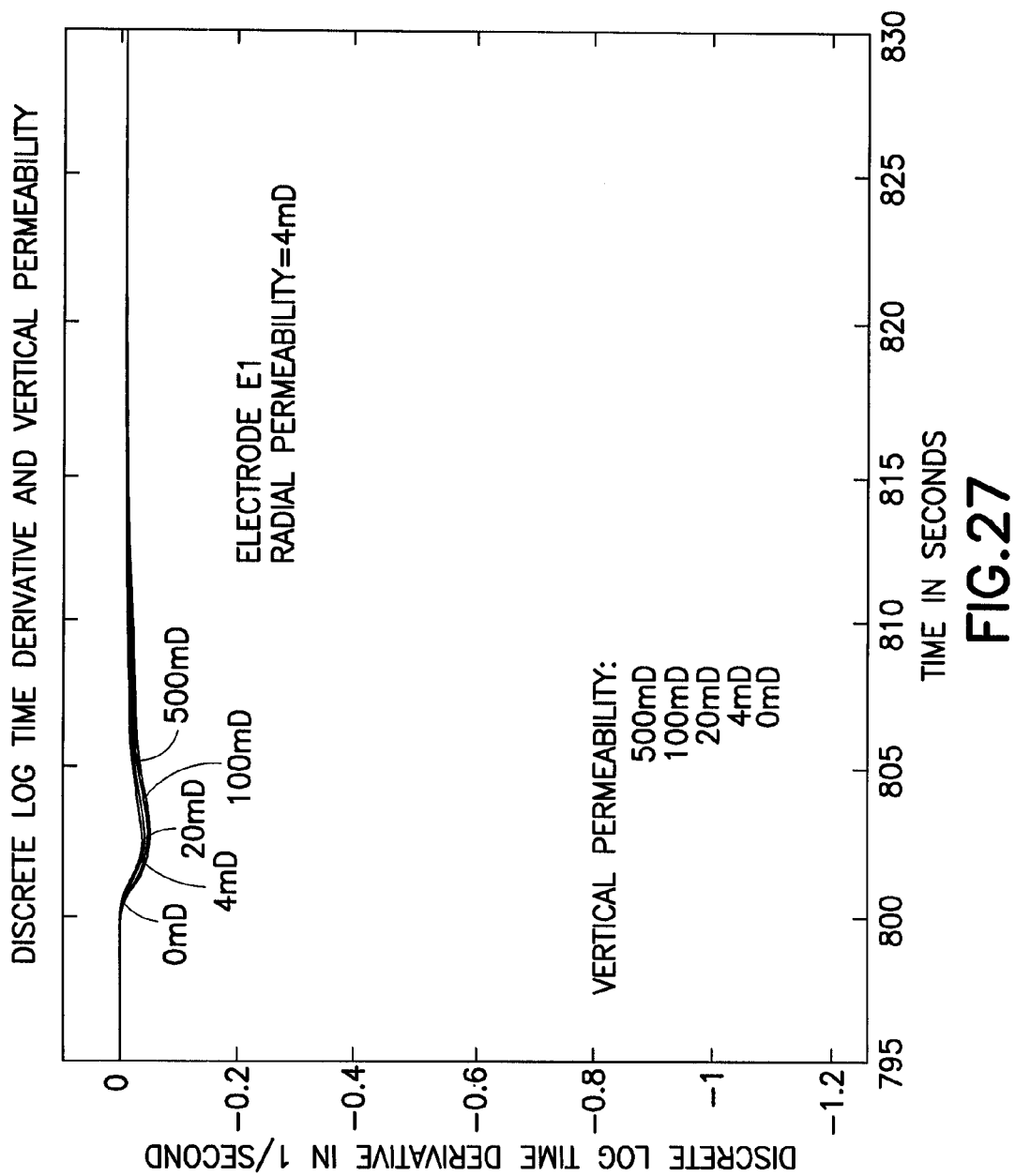
FIG. 27 is a plot of discrete log time derivatives of the DC component of the streaming potential signal measured by the electrode E1 over a set of varying vertical permeabilities and a radial permeability of 4 mD, which is generated by the model of FIG. 3.

In accordance with yet another aspect of the present invention, the streaming potential signals measured by one or more of the four electrodes E1, E2, E3, E4 of the assembly 100 can be used to characterize the radial permeability and vertical permeability of the formation. After drilling is stopped, mudcake quickly forms to stop fluid loss in an over-balanced situation. The streaming potential signals decrease with time as the pressure gradient diffuses into the formation. The decay is fast for formations of high permeability and slow for formations of low permeability. FIG. 22 shows the DC component measured by electrode E1 for five different values of radial permeability with a vertical permeability of 100 mD. It can be seen that the decay rate is quite sensitive to radial permeability. FIG. 23 shows the DC component measured by electrode E1 for five different values of vertical permeability with a radial permeability of 100 mD. FIG. 24 shows the DC component measured by the electrode E1 for five different values of vertical permeability with the radial permeability fixed at 4 mD. For better visualization of the sensitivity of the decay rate to permeability, the discrete log time derivatives (the difference between the DC components at two time sample points divided by the DC component at the mid time sample point) are shown in FIGS. 25–27, wherein the time interval is a short interval of around 800 seconds when the drilling stops. The sensitivity of the DC component to the radial permeability of the formation is clear from the relatively large separations between the curves of FIG. 25. The insensitivity of the DC component to vertical permeability with the radial permeability fixed at 100 mD is clear from the relatively small separations between the curves of FIG. 26. And the insensitivity of the DC component to vertical permeability with the radial permeability fixed at 4 mD is clear from the relatively small separations between the curves of FIG. 27. From these properties, it can be concluded that after the drilling stops and mudcake builds up, the relaxation of the excess pressure near the borehole is primarily in a radial direction.

Figure 28:
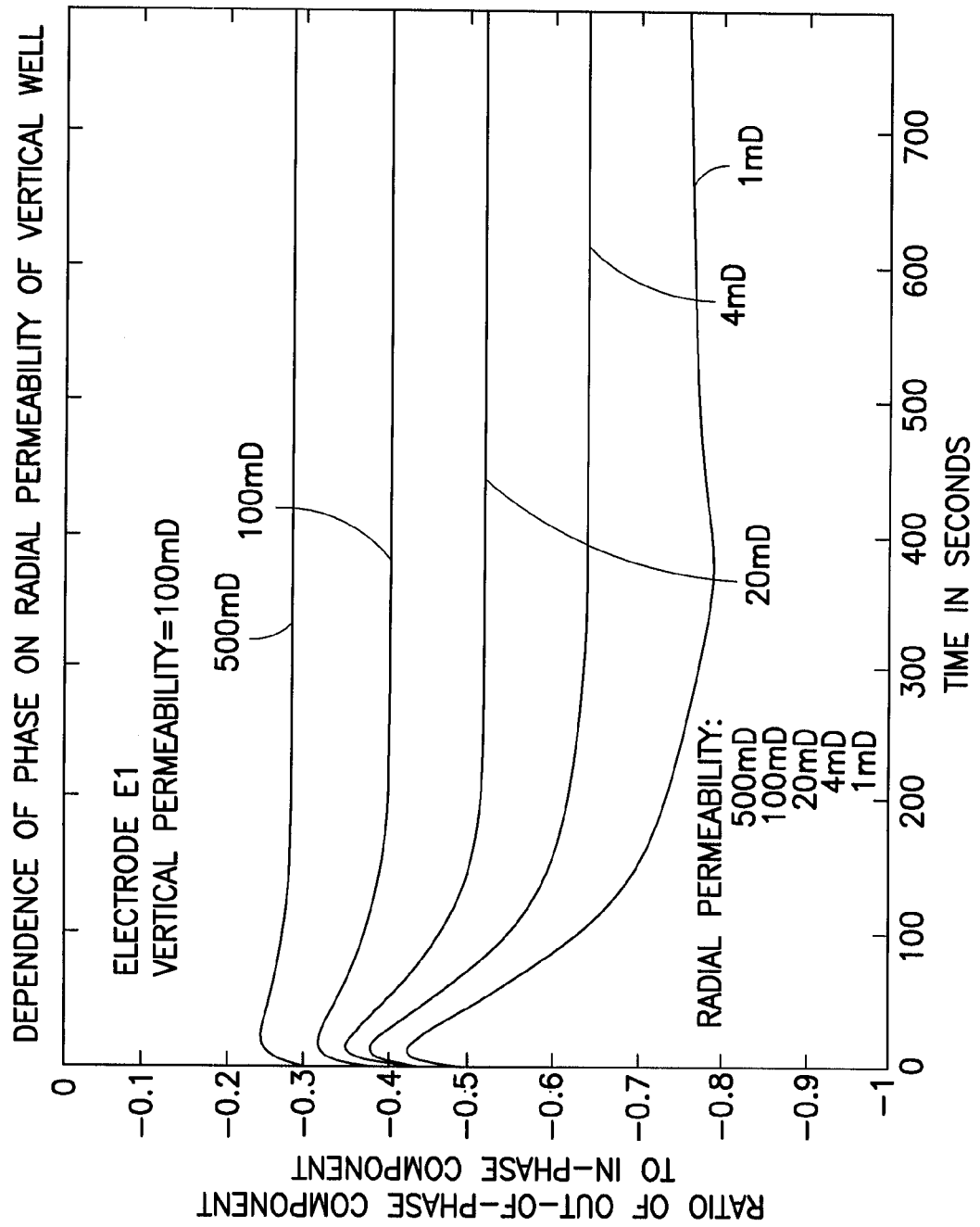
FIG. 28 is a plot of the ratio of the out-of-phase component to the in-phase component of the streaming potential signal measured by the electrode E1 over a set of varying radial permeabilities and a vertical permeability of 100 mD, which is generated by the model of FIG. 3.
Figure 29:
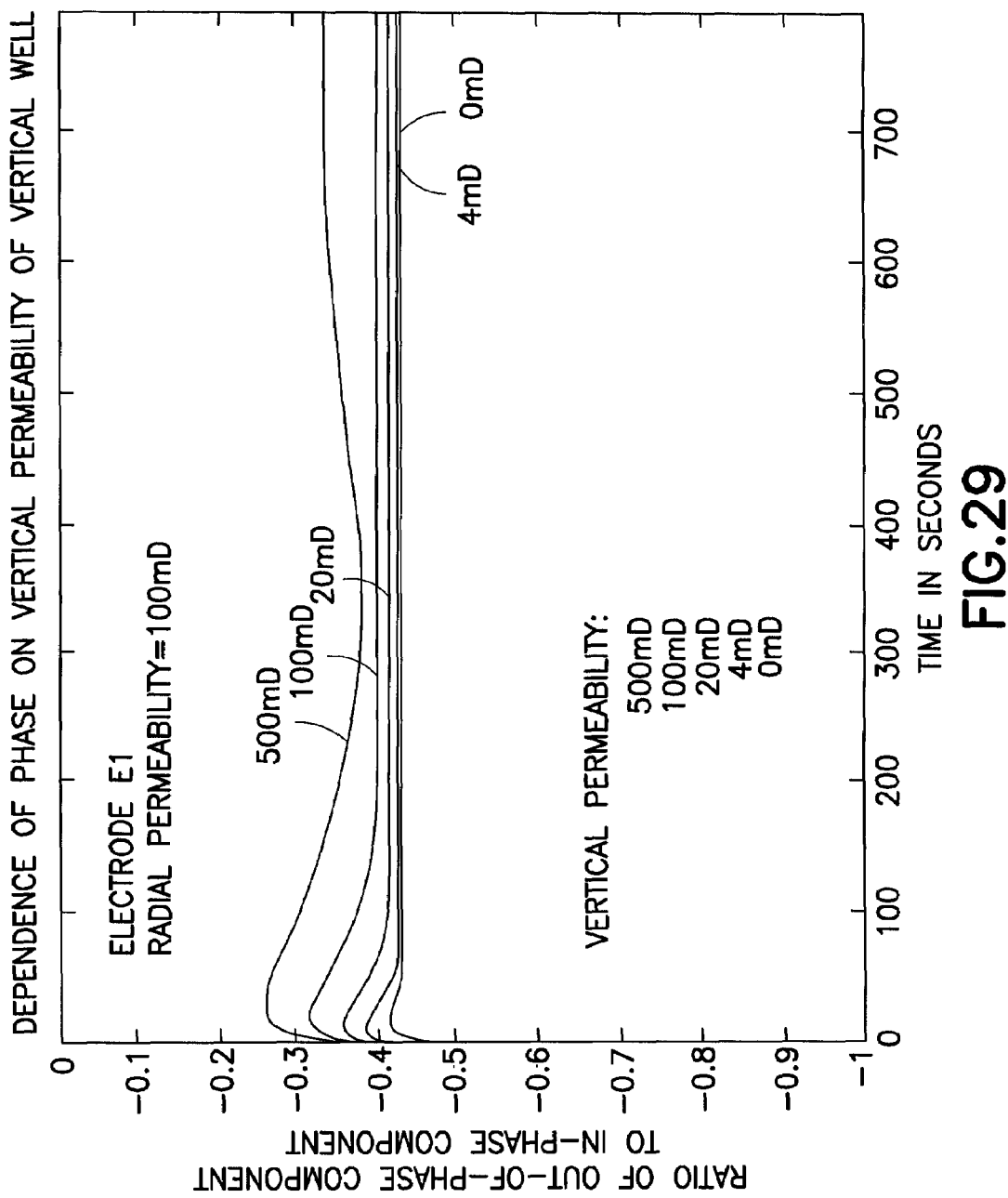
FIG. 29 is a plot of the ratio of the out-of-phase component to the in-phase component of the streaming potential signal measured by the electrode E1 over a set of varying vertical permeabilities and a radial permeability of 100 mD, which is generated by the model of FIG. 3.
Figure 30:
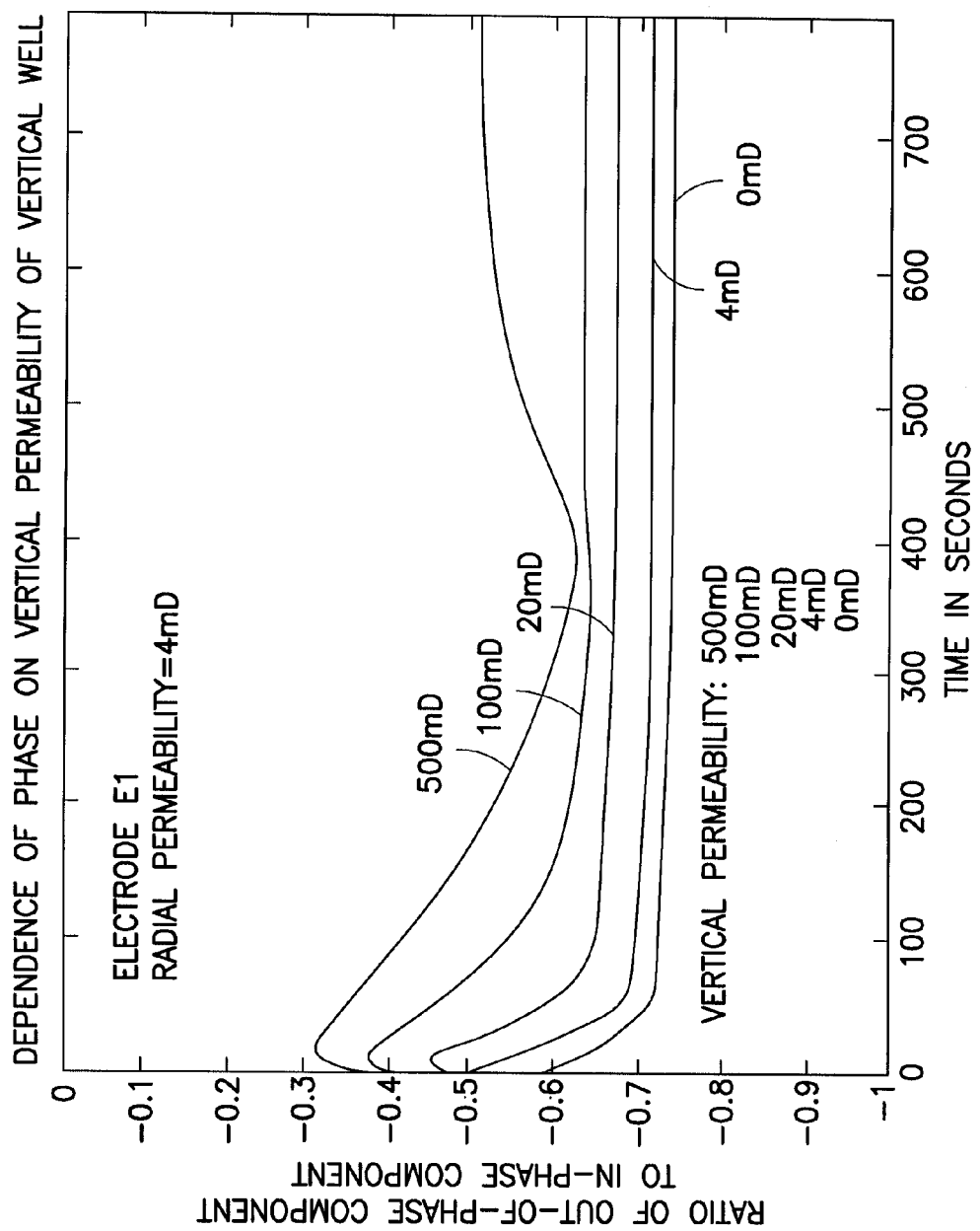
FIG. 30 is a plot of the ratio of the out-of-phase component to the in-phase component of the streaming potential signal measured by the electrode E1 over a set of varying vertical permeabilities and a radial permeability of 4 mD, which is generated by the model of FIG. 3.

FIG. 28 depicts the ratio of the out-of-phase component to the in-phase component (i.e. the tangent of the phase angle) of the AC streaming potential signal measured by electrode E1 for five different values of radial permeability with the vertical permeability fixed at 100 mD. FIG. 29 depicts the tangent of the phase angle of the streaming potential signal measured by electrode E1 for five different values of vertical permeability with the radial permeability fixed at 100 mD. And FIG. 30 depicts the tangent of the phase angle of the streaming potential signal measured by electrode E1 for five different values of vertical permeability with the radial permeability fixed at 4 mD. It can be seen that the tangent of the phase angle of the streaming potential signal is sensitive to both the radial permeability and the vertical permeability. In all three FIGS. 28–30, the absolute value of the phase angle tangent decreases as the permeability increases. In the limit of infinite permeability (or zero compressibility) the pressure response inside the formation to the borehole pressure variations is instantaneous. Sources of streaming currents inside the formation are always in phase with the borehole pressure. The phase angle approaches zero as the permeability approaches infinity.

Since the decay rates and the phase angle tangents have different sensitivities to the radial permeability and to the vertical permeability, it is possible to estimate both the radial permeability and the vertical permeability with the combined DC and AC components. By minimizing the difference between the measured and calculated values, both radial permeability and vertical permeability are estimated.

If the DC signal component of the streaming potential signal is unavailable, it is possible to estimate the permeability of the formation with the AC components alone. In this analysis, an assumption is made as the ratio between the radial permeability and the vertical permeability.

Figure 31:
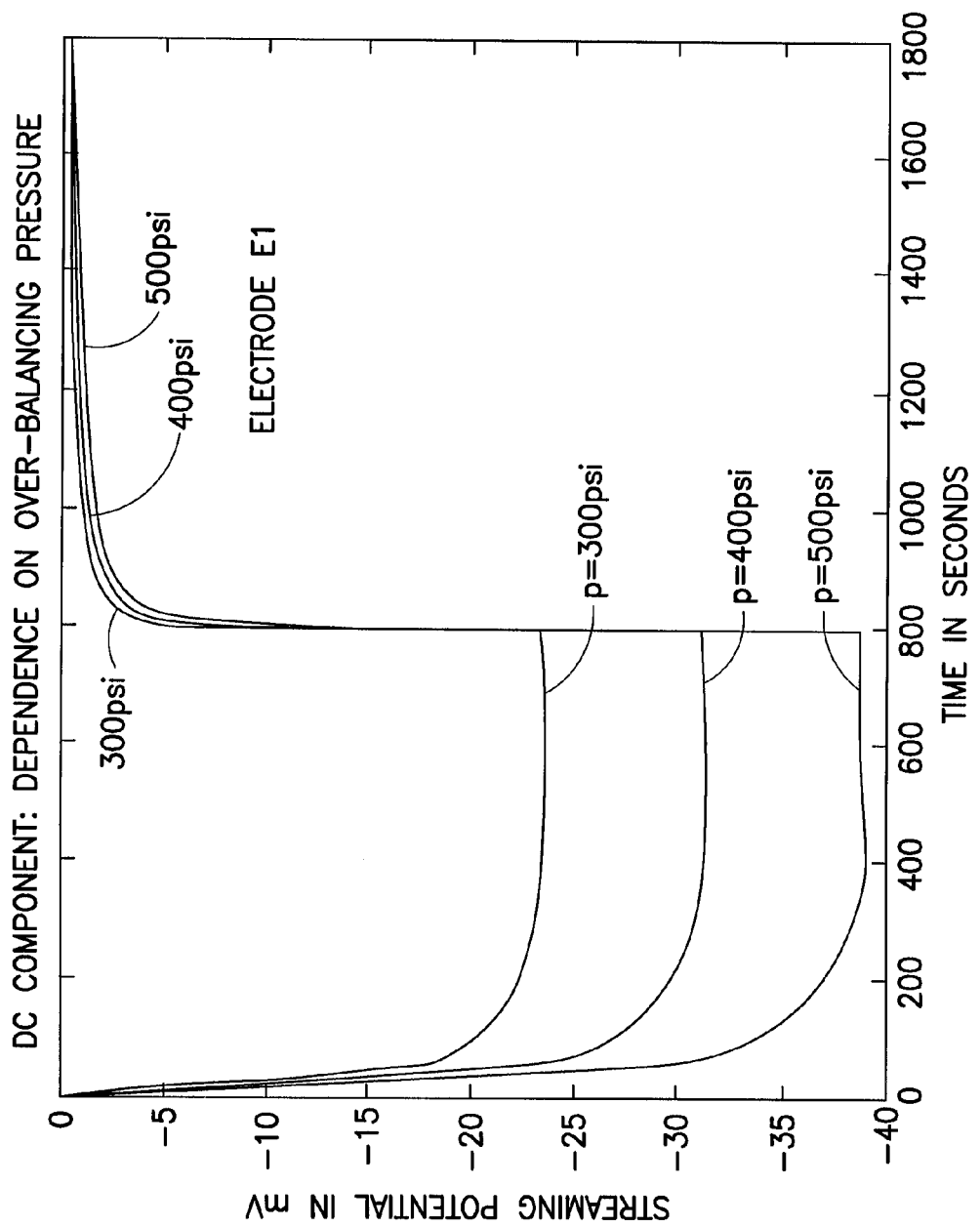
FIG. 31 is a plot of the DC component of the streaming potential signal measured by the electrode E1 in conjunction with a set of over-balanced pressure values, which is generated by the model of FIG. 3.
Figure 32:
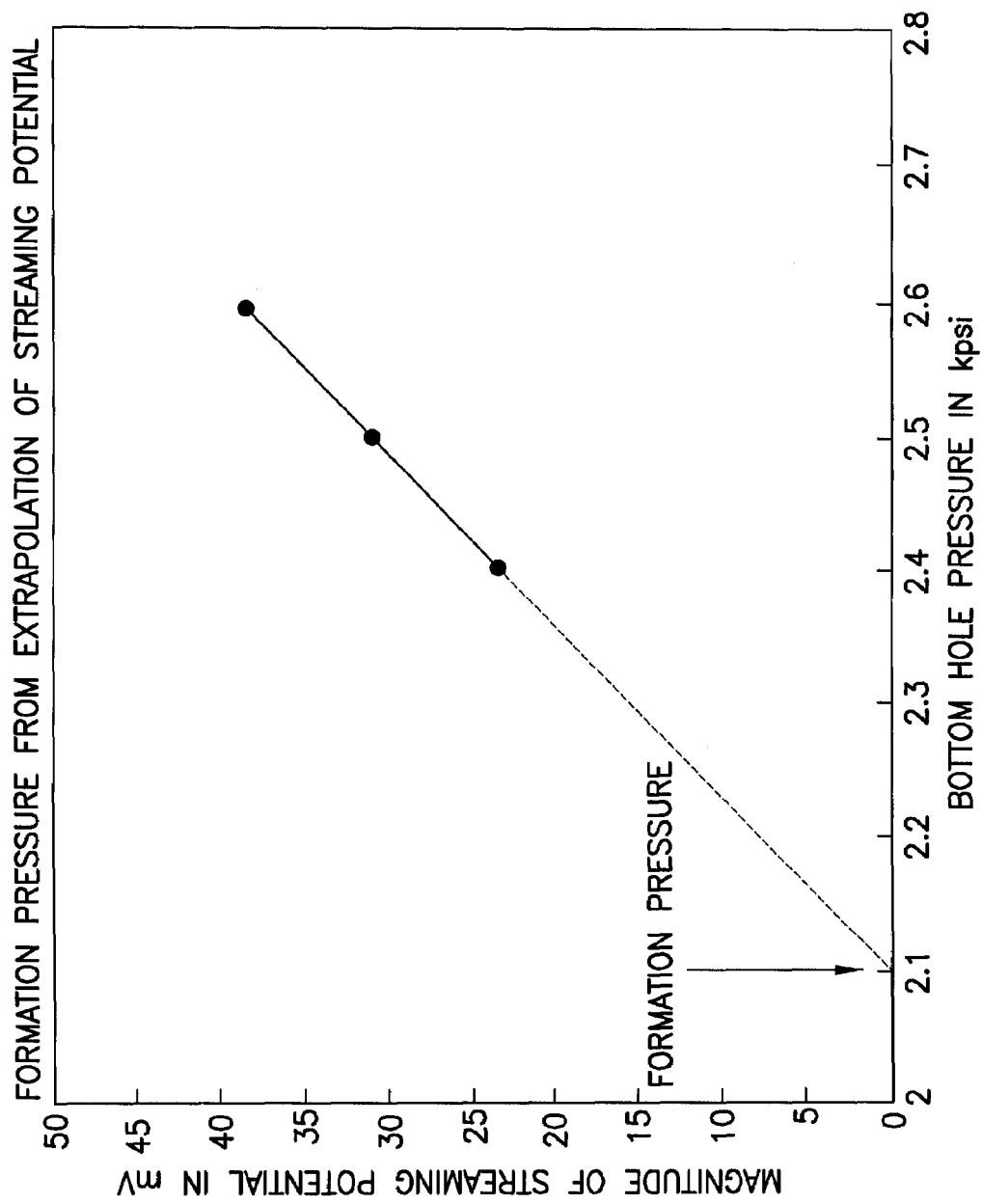
FIG. 32 is a diagram illustrating curve-fitting operations that derive an estimate of formation pressure while drilling based upon the magnitude of streaming potential measurements over a set of varying over-balancing pressures.

In accordance with yet another aspect of the present invention, the streaming potential signals measured by one or more of the four electrodes E1, E2, E3, E4 of the assembly 100 can be used to estimate formation pressure. FIG. 31 shows the DC component of the streaming potential signal measured at electrode E1 for three different over-balancing pressures (500 psi, 400 psi, and 300 psi). The borehole pressure can be varied by controlling the rate of the mud pumps, by varying the weight of the drilling mud, or by tripping the drill string into (or out) of the borehole. It is evident from FIG. 31 that the DC streaming potential signals are proportional to the over-balance pressure. Therefore, the formation pressure can be estimated by measuring the DC components of the streaming potential at a plurality of different borehole pressures. The magnitudes of the streaming potential for the different over-balancing pressures are fit to a straight line according to Darcy's law. This straight line is extrapolated to determine the formation pressure at zero streaming potential. This pressure (the pressure at zero streaming potential) is the formation pressure. The estimation method is shown schematically in FIG. 32. The estimation of formation pressure while drilling is extremely important for drilling safety.

In accordance with yet another aspect of the present invention, the streaming potential signals measured by one or more of the four electrodes E1, E2, E3, E4 of the assembly 100 can also be used for the early detection of abnormal formation pressures. For example, if the formation pressure becomes higher than the borehole pressure, the sign of the DC component of the streaming potential signals will reverse. This reversal of sign will be observable before sufficient fluid has flowed into the borehole for the pressure change to be directly observable. The build-up of the flow reversal may happen over a short but finite period of time as the abnormal pressure zone is being drilled. Any reversal of flow will be immediately observable in the DC component of the streaming potential measurements. Therefore, the DC component streaming potential measurements have value in the early detection of abnormal formation pressure. Because the streaming measurement is made very close to the drill bit, this provides the earliest possible warning of an overpressured formation.

Figure 33:
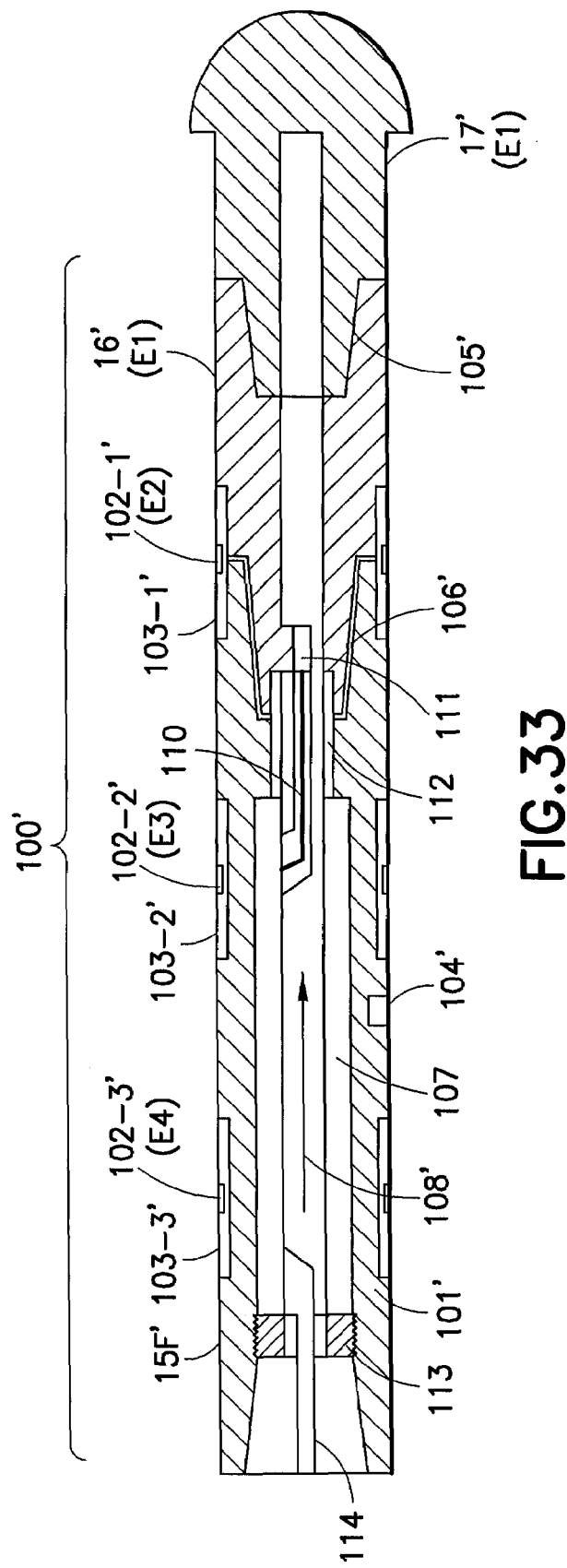
FIG. 33 is a schematic diagram of a logging-while drilling tool and a drill bit.

A preferred embodiment of an LWD tool 100' designed to measure the streaming potential is shown in FIG. 33. The drill bit 17' is attached to the drill collar section 16' of the LWD tool 100' by a coupling 105'. The top of the drill collar 16' is interconnected to the bottom of drill collar section 15F' by an insulation joint 106' that electrically insulates the metal body of the drill collar section 15F' from the drill collar 16' and the drill bit 17'. The insulation joint 106' allows the metal body of the drill collar 16' and drill bit 17', collectively, to be used as a measuring electrode for streaming potential measurements and also allows the metal body 101' of the drill collar section 15F' to be used as a voltage reference electrode for streaming potential measurements as described herein. The drilling mud 108' passes though the interior of the LWD tool and the drill bit 17' to lubricate the drill bit 17' and to remove cuttings. A pressure sensor 104' measures the borehole pressure. The insulated joint 106' can consist of a shop connection where the pin has a thin ceramic coating, approximately 0.010 to 0.020 inches thick. The ceramic-coated pin connection is screwed into a mating box connection, and the assembled shop connection is injected with epoxy. This shop connection is permanent and not broken after the tool is manufactured. This assembly can provide a high degree of electrical insulation between the drill collar 16' and the collar section 15F'.

A layer of insulation 103-1' covers the exterior of the insulated joint 106', while another layer of insulation 112 covers the inside. These external and internal layers of insulation can be made of fiberglass and/or rubber, for example. Their purpose is to increase the electrical resistance between the lower electrode E1 (drill collar 16' and drill bit 17') and the drill collar 15F, which would otherwise be reduced when conductive drilling mud is present. The external layer of insulation 103-1' also provides electrical insulation around the E2 electrode 102-1' to increase the signal strength. The electrodes 102-1' (E2), 102-2' (E3) and 102-3' (E4) can be metal rings embedded in the insulating layers 103-1', 103-2', and 103-3', respectively. Each of these three electrodes is attached to the measurement electronics by pressure bulkheads and wires (not shown). These external insulating layers and electrodes can be mounted flush with the exterior of the drill collar or slightly recessed to prevent damage. Wearbands with a slightly larger diameter than the drill collar can also be added to prevent damage to the electrodes.

Electrode E1 (drill collar 16' and drill bit 17') is connected to the measurement electronics that are housed in the annular chassis 107' by an internal electrical extender 110 that plugs into an electrical socket 111. The electrical socket 111 is directly attached to a top interior portion of the drill collar 16' to provide electrical connection to the E1 electrode (drill collar 16' and drill bit 17'). The electrical extender 110 consists of a wire or medal rod that mates with the electrical socket 111 when the shop connection is made-up. An insulating layer surrounds the electrical extender 110, and serves the same purpose as the internal insulating layer 112.

Electronics chassis 107' preferably contains the measurement electronics, a processor and memory, a clock, communication electronics, and may also contain a battery. The annular chassis 107' is preferably made of metal and provides an airtight chamber for the electronics. The annular chassis 107' may be held inside the drill collar section 15F' with jam-nut 113 which threads into the collar section 15F'. An electrical extender 114 on the upper connection of the LWD tool provides an electrical connection to an MWD tool (not shown), which communicates with the drilling rig via mud pulse telemetry or electromagnetic telemetry.

Figure 34:
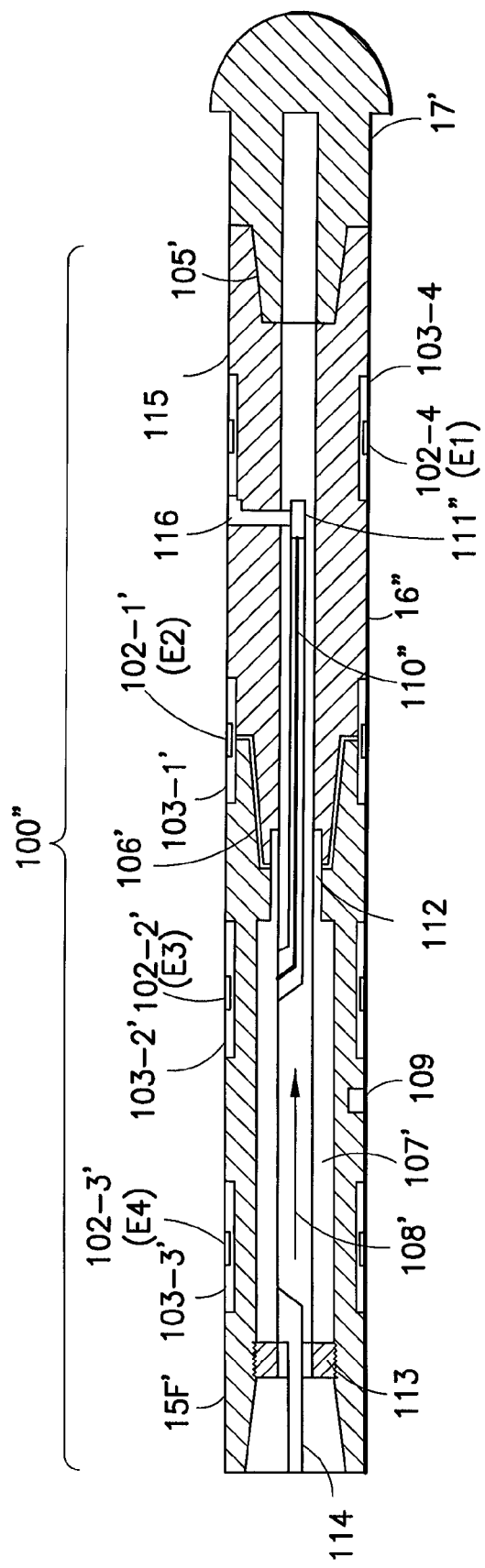
FIG. 34 is a schematic diagram of a drill bit and a logging-while drilling tool with all electrodes insulated from the rest of the tool.

Another embodiment of an LWD tool 100" designed to measure the streaming potential is shown in FIG. 34. This embodiment is similar in many respects to the embodiment of FIG. 33. Thus, for simplicity of description, reference numerals are shared for the common elements and the description below addresses only the differences therebetween. In the embodiment of FIG. 34, the bottom E1 electrode is realized by an external insulating layer 103-4 and electrode 1024 mounted on the exterior of the drill collar 16". The electrode 102-4 may be realized a metal ring embedded in the insulating layer 103-4. Similar to the external electrodes mounted above the bottom electrode 102-4, the external insulating layer 103-4 and the electrode 102-4 can be mounted flush with the exterior of the drill collar 16" or slightly recessed to prevent damage. Wearbands with a slightly larger diameter than the drill collar 16" can also be added to prevent damage to the electrodes. The insulation layer 1034 insulates the E1 electrode 1024 from the body of the drill collar 16". The electrical extender 110", the electrical socket 111" and the bulkhead 116 connect the electrode 102-4 to the measurement electronics that are housed in the annular chassis 107'.

Figure 35B:
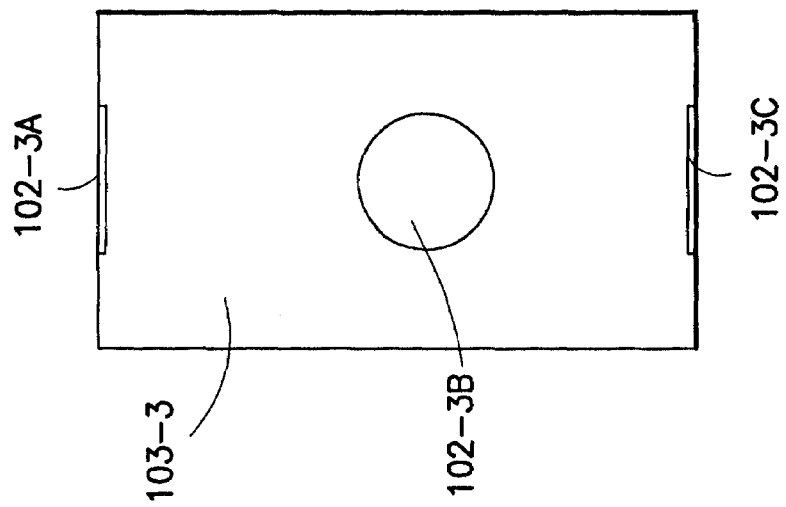
FIGS. 35A and 35B are schematic diagrams of multiple electrodes distributed about the circumference of a drill collar.
Figure 35A:
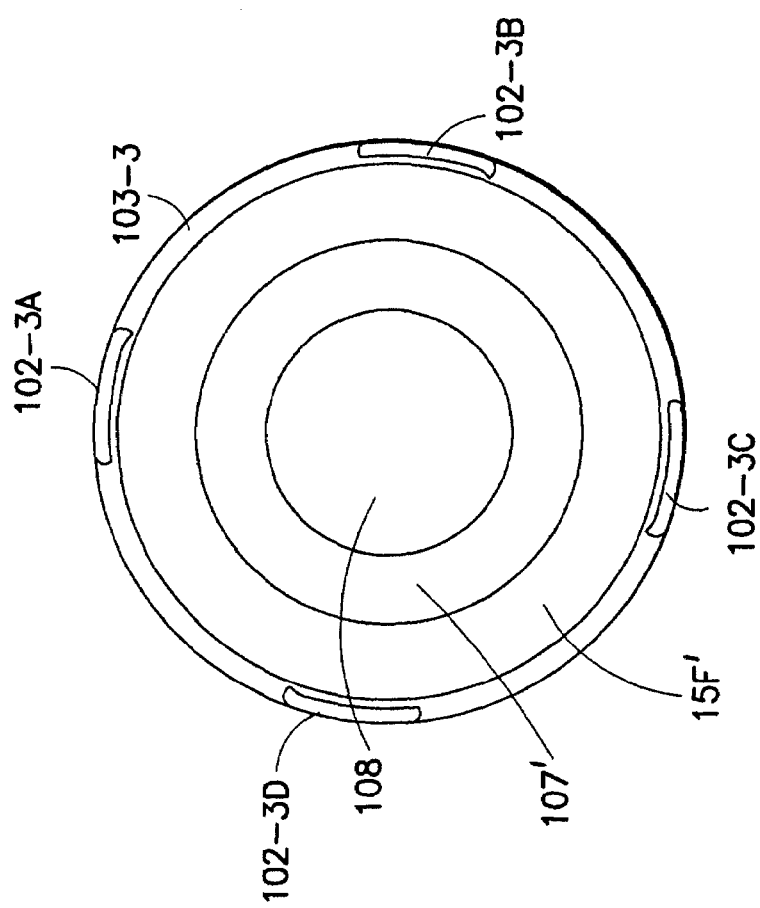

Turning now to FIGS. 35A and 35B, an electrode of the tools described herein, such as the E4 electrode 102-3' of FIGS. 33 and 34, may be segmented into several separate electrodes, in order to measure azimuthal variations of streaming potential. FIGS. 35A and 35B show four electrodes (102-3A, 102-3B, 102-3C and 102-3D) distributed about the circumference of drill collar 15F. The cross-sectional view of FIG. 35A is perpendicular to the views in FIGS. 33 and 34. The view of FIG. 35B shows only the insulation 103-3 and three of the four electrodes. The four electrodes are connected to the electronics by bulkheads and wires (not shown). Any of the four electrodes (E1, E2, E3 and E4) of the tools described herein may be so configured.

There have been described and illustrated herein several embodiments of apparatus and methods for measuring streaming potentials and characterizing earth formation characteristics therefrom. While particular embodiments of the invention have been described, it is not intended that the invention be limited thereto, as it is intended that the invention be as broad in scope as the art will allow and that the specification be read likewise. Thus, while particular electrode arrangements have been disclosed, it will be appreciated that modifications can be made, provided the arrangement includes an array of electrodes capable of measuring streaming potentials. Thus, while it is preferable to surface mount the electrodes and pressure sensor on the drill string sections of the bottom hole assembly, it will be recognized that the electrode and pressure sensor may be mounted to the drill string as part of a stabilizing collar or other collar assembly. It will be appreciated that other configurations could be used as well. If the well is drilled using casing drilling, liner drilling, or coiled tubing drilling, it is understood that the same principles could be applied to these other drilling methods. The electrodes, insulation, isolation joint, and other aspects described herein could be implemented on casing section, liner sections, or coiled tubing. It will therefore be appreciated by those skilled in the art that yet other modifications could be made to the provided invention without deviating from its spirit and scope as claimed.

What is claimed is:

1. A method for characterizing a pressure of an earth formation traversed by a hole while drilling the hole comprising:
   i) varying the bottom hole pressure;
   ii) measuring a plurality of different bottom hole pressures;
   iii) deriving a DC component of a streaming potential voltage signal corresponding to each one of said plurality of different bottom hole pressures;
   iv) fitting the DC components and corresponding bottom hole pressures to a linear equation represented by a straight line; and
   v) using said linear equation to derive an estimate of the pressure of the earth formation.

2. A method according to claim 1, wherein:
   in i), the bottom hole pressure is varied by varying circulation rate of mud in the hole.

3. A method according to claim 1, wherein:
   in i) the bottom hole pressure is varied by varying the weight of the mud circulating in the hole.

4. A method according to claim 1, wherein:
   in v), said linear equation is solved to identify a particular bottom hole pressure value that corresponds to a DC component value that is substantially zero, and said particular bottom hole pressure value is output as the estimate of the pressure of the earth formation.

5. A method for determining a pressure of a subsurface formation surrounding a wellbore, the method comprising:
   (i) varying the bottom hole pressure;
   (ii) measuring a plurality of different bottom hole pressures;
   (iii) deriving a component of a streaming potential voltage signal corresponding to each one of said plurality of different bottom hole pressures;
   (iv) extrapolating the components to substantially zero potential; and
   (v) using the extrapolation to derive an estimate of the pressure of the subsurface formation.

6. The method according to claim 5, wherein:
   in step (i), the bottom hole pressure is varied by varying circulation rate of mud in the wellbore.

7. The method according to claim 5, wherein:
   in step (i), the bottom hole pressure is varied by varying the weight of the mud circulating in the wellbore.

8. The method according to claim 5, wherein:
   in step (iii), the component of a streaming potential voltage signal is a DC component value.

9. The method according to claim 5 wherein the pressure is determined while drilling the wellbore.

10. The method of claim 5, further comprising:
    (vi) transmitting the estimated pressure.

* * * * *